US011513182B2

(12) United States Patent
Sheng et al.

(10) Patent No.: US 11,513,182 B2
(45) Date of Patent: Nov. 29, 2022

(54) USER EQUIPMENT IN WIRELESS COMMUNICATION SYSTEM, ELECTRONIC DEVICE, METHOD AND STORAGE MEDIUM

(71) Applicant: Sony Corporation, Tokyo (JP)

(72) Inventors: Bin Sheng, Nanjing (CN); Pingping Xu, Nanjing (CN); Penshun Lu, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 130 days.

(21) Appl. No.: 17/056,014

(22) PCT Filed: May 10, 2019

(86) PCT No.: PCT/CN2019/086402
§ 371 (c)(1),
(2) Date: Nov. 17, 2020

(87) PCT Pub. No.: WO2019/218940
PCT Pub. Date: Nov. 21, 2019

(65) Prior Publication Data
US 2021/0255271 A1   Aug. 19, 2021

(30) Foreign Application Priority Data

May 17, 2018   (CN) .......................... 201810474674.3

(51) Int. Cl.
*H04W 24/00*   (2009.01)
*G01S 3/38*   (2006.01)
(Continued)

(52) U.S. Cl.
CPC .................................... *G01S 3/38* (2013.01);
*G01S 5/02* (2013.01); *H04W 64/00* (2013.01)

(58) Field of Classification Search
CPC ............. G01S 3/38; G01S 5/02; H04W 64/00
See application file for complete search history.

(56) References Cited

U.S. PATENT DOCUMENTS

| 2004/0208238 A1* | 10/2004 | Thomas | ................ G01S 5/0215 |
| | | | 375/148 |
| 2006/0205499 A1* | 9/2006 | Jarvis | ..................... G07F 17/32 |
| | | | 463/30 |

(Continued)

FOREIGN PATENT DOCUMENTS

| CN | 101658063 A | 2/2010 |
| CN | 101835173 A | 9/2010 |

(Continued)

OTHER PUBLICATIONS

International Search Report and Written Opinion dated Aug. 9, 2019 for PCT/CN2019/086402 filed on May 10, 2019, 9 pages including English Translation of the International Search Report.

(Continued)

*Primary Examiner* — Justin Y Lee
(74) *Attorney, Agent, or Firm* — Xsensus LLP

(57) ABSTRACT

The present disclosure relates to a user equipment in a wireless communication system, an electronic device, a method and a storage medium. The user equipment in the wireless communication system according to the present disclosure comprises one or more processing circuits, the processing circuits being configured to execute the following operations: acquiring a downlink signal from an electronic device in the wireless communication system; estimating the angle of arrival (AOA) of the downlink signal, wherein at least the AOA and the position of the electronic device are used for estimating the position of the user equipment. By using the user equipment, electronic device, method and storage medium according to the present disclosure, the AOA of a downlink signal may be estimated (Continued)

when the user equipment is in an idle or initial access state, and the AOA may be used for estimating the position of the user equipment.

7 Claims, 17 Drawing Sheets

(51) Int. Cl.
    *G01S 5/02*     (2010.01)
    *H04W 64/00*     (2009.01)

(56) References Cited

U.S. PATENT DOCUMENTS

| | | | | |
|---|---|---|---|---|
| 2008/0261623 | A1* | 10/2008 | Etemad | G01S 5/12 455/456.2 |
| 2012/0258729 | A1 | 10/2012 | Siomina | |
| 2016/0205499 | A1* | 7/2016 | Davydov | G01S 5/0268 455/456.1 |
| 2020/0280894 | A1* | 9/2020 | Koskinen | H04W 48/16 |
| 2020/0396710 | A1* | 12/2020 | Wigren | G01S 5/0215 |

FOREIGN PATENT DOCUMENTS

| | | |
|---|---|---|
| CN | 104219620 A | 12/2014 |
| CN | 107318161 A | 11/2017 |
| WO | 2010/038998 A2 | 4/2010 |
| WO | 2013/051969 A1 | 4/2013 |
| WO | WO-2018028925 A1 | 2/2018 |

OTHER PUBLICATIONS

3GPP TS 36.214, "3rd Generation Partnership Project; Technical Specification Group Radio Access Network; Evolved Universal Terrestrial Radio Access (E-UTRA); Physical layer; Measurements (Release 15)", V15.1.0, Mar. 2018, total 27 pages.

3GPP TS 36.305, 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14), V14.3.0, Sep. 2017, total 78 pages.

3GPP TS 38.133, "3rd Generation Partnership Project; Technical Specification Group Radio Access Network; NR; Requirements for support of radio resource management; (Release 15)", V15.1.1, May 2018, total 70 pages.

* cited by examiner

USER EQUIPMENT IN WIRELESS COMMUNICATION SYSTEM, ELECTRONIC DEVICE, METHOD AND STORAGE MEDIUM

CROSS-REFERENCE TO RELATED APPLICATIONS

The present application is based on PCT filing PCT/CN2019/086402, filed May 10, 2019, which claims priority to Chinese Patent Application No. 201810474674.3, titled "USER EQUIPMENT IN WIRELESS COMMUNICATION SYSTEM, ELECTRONIC DEVICE, METHOD AND STORAGE MEDIUM", filed on May 17, 2018 with the China National Intellectual Property Administration, each of which is incorporated herein by reference in its entirety.

FIELD

The present disclosure relates to the technical field of wireless communications, and in particular to a user equipment and an electronic equipment in a wireless communication system, a method for performing wireless communication in a wireless communication system and a computer readable storage medium.

BACKGROUND

At present, there are various cellular-based positioning technologies supported by the fourth generation (4G) mobile communication system, including technologies of Observed Time Difference Of Arrival (OTDOA) and Angle of Arrival (AOA)+Timing Advanced (TA). In the OTDOA technology, a location of a User Equipment (UE) is estimated by transmitting positioning pilot signals through a downlink channel, and then measuring a time difference of arrival of the pilot signals of each base station at the UE. In the AOA+TA technology, a location of a UE is estimated mainly by measuring an AOA and arrival time of an uplink signal. In the conventional technology, it is required to establish a Radio Resource Control (RRC) connection first, thus it is impossible to estimate the location of the UE in an RRC Idle state or an initial access state.

In order to support large connections with low power consumption, a new RRC state, i.e., an RRC Connected Inactive state is introduced into the fifth generation (5G) mobile communication system, on the basis of the original RRC Connected state and the RRC Idle state. When the UE is in an RRC Idle state, the UE may query a paging channel to determine whether there is a network to establish a connection therewith. Since it is required to establish an RRC connection first before performing positioning in the conventional OTDOA technology and the AOA+TA technology, the UE cannot estimate its own location when it is in the RRC Idle state. In an Inactive state, although the UE is in the RRC connection with the network, the UE releases most of the wireless resources to save power, and only the connection for some control information is maintained. In this case, it is required to return to the RRC Connected state to use the conventional positioning technologies. Therefore, the conventional positioning solutions cannot be applied in the Inactive state.

Therefore, it is required to propose a technical solution to estimate a location of a UE even when the UE is in an RRC Idle state or an initial access state.

SUMMARY

This section provides a general summary of the present disclosure, rather than a comprehensive disclosure of full scope or all features of the present disclosure.

An object of the present disclosure is to provide a user equipment and an electronic equipment in a wireless communication system, a method for performing wireless communication in a wireless communication system and a computer readable storage medium, so that a location of a user equipment can be estimated when the user equipment is in an RRC Idle state or an initial access state.

According to one aspect of the present disclosure, a user equipment in a wireless communication system is provided. The user equipment includes one or more processing circuits configured to perform the operations of: acquiring a downlink signal from an electronic equipment in the wireless communication system; and estimating an Angle of Arrival AOA of the downlink signal, where at least the AOA and a location of the electronic equipment are used to estimate a location of the user equipment.

According to another aspect of the present disclosure, an electronic equipment in a wireless communication system is provided. The electronic equipment includes a transceiver; and one or more processing circuits configured to perform the operation of: causing the transceiver to transmit a downlink signal, such that a user equipment in the wireless communication system estimates an Angle of Arrival AOA of the downlink signal, where at least the AOA and a location of the electronic equipment are used to estimate a location of the user equipment.

According to another aspect of the present disclosure, a method for performing wireless communication in a wireless communication system is provided. The method includes: acquiring a downlink signal from an electronic equipment in the wireless communication system; and estimating an Angle of Arrival AOA of the downlink signal, where at least the AOA and a location of the electronic equipment are used to estimate a location of the user equipment.

According to another aspect of the present disclosure, a method for performing wireless communication in a wireless communication system is provided. The method includes transmitting a downlink signal by an electronic equipment in the wireless communication system, such that a user equipment in the wireless communication system estimates an Angle of Arrival AOA of the downlink signal, where at least the AOA and a location of the electronic equipment are used to estimate a location of the user equipment.

According to another aspect of the present disclosure, a computer readable storage medium is provided. The computer readable storage medium includes executable computer instructions that, when executed by a computer, cause the computer to execute the method according to the present disclosure.

With the user equipment and the electronic equipment in a wireless communication system, the method for performing wireless communication in a wireless communication system and the computer readable storage medium according to the present disclosure, an Angle of Arrival AOA of a downlink signal can be estimated when the user equipment is in an RRC Idle state or an initial access state. The AOA can be used to estimate a location of the user equipment, thereby solving the problem that the user equipment cannot be located in the RRC Idle state or the like.

Further areas of applicability will become apparent from the description provided herein. The description and specific examples in the summary are only illustrative and are not intended to limit the scope of the present disclosure.

BRIEF DESCRIPTION OF THE DRAWINGS

The drawings described herein are used for illustrating the selected embodiments, rather than all of the possible embodiments, and are not intended to limit the scope of the present disclosure. In the drawings.

Figure 1:
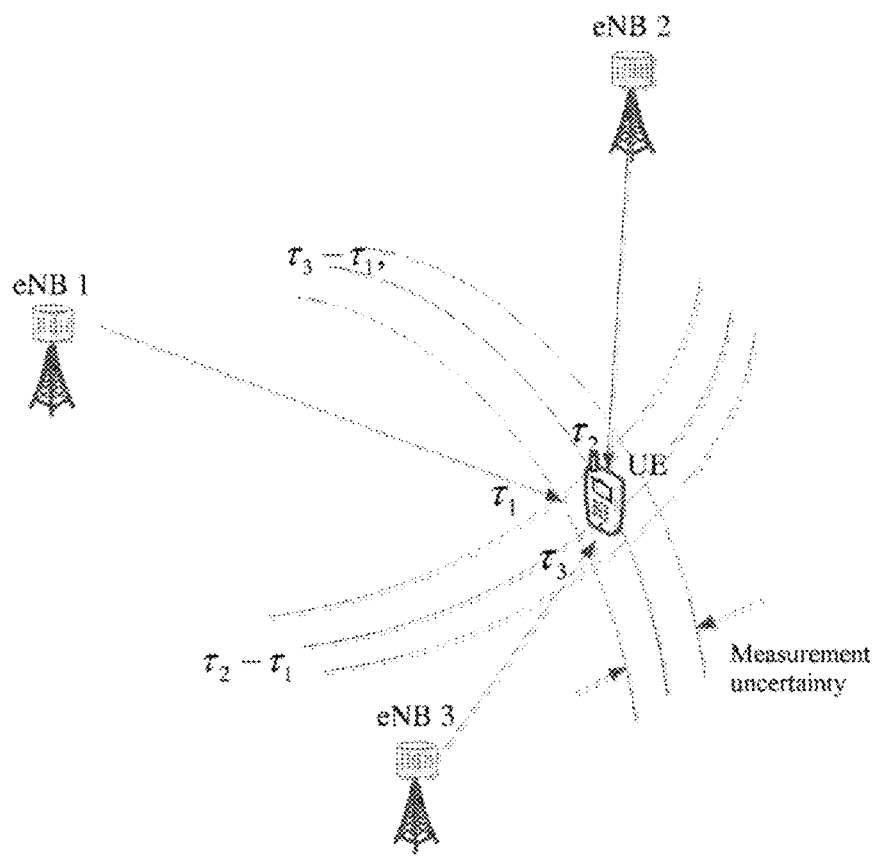
FIG. 1 is a schematic diagram illustrating a positioning principle of an Observed Time Difference Of Arrival (OT-DOA) technology known by the inventor.

Although the present disclosure is susceptible to various modifications and alternatives, the specific embodiments thereof have been illustrated in the drawings as examples and described in detail herein. It should be understood, however, that the description of the specific embodiments herein is not intended to limit the present disclosure to the disclosed specific form, but rather, the object of the present disclosure is to cover all of modifications, equivalents and replacements that fall within the spirit and scope of the present disclosure. It is noted that throughout the several drawings, corresponding reference numerals indicate corresponding components.

DETAILED DESCRIPTION OF EMBODIMENTS

Examples of the present disclosure are described now more fully with reference to the drawings. The description below is merely exemplary in nature and is not intended to limit the present disclosure, application, or use.

Exemplary embodiments are provided to make the present disclosure thorough and fully convey the scope of the present disclosure to those skilled in the art. Examples of many specific details such as specific components, devices and methods are set forth to provide thorough understanding for the embodiments of the present disclosure. It will be apparent to those skilled in the art that exemplary embodiments may be implemented in many different forms without the use of specific details, and they should not be construed as limiting the scope of the present disclosure. In some exemplary embodiments, well-known processes, well-known structures, and well-known technologies are not described in detail.

A user equipment (UE) involved in the present disclosure includes but is not limited to a terminal having a wireless communication function, such as a mobile terminal, a computer, an in-vehicle device, etc. Further, depending on a function specifically described, the UE involved in the present disclosure may also be the UE itself or a component, such as a chip, in the UE. In addition, similarly, a base station involved in the present disclosure may be an evolution Node Base station (eNB), a gNB (a base station in the fifth generation communications system), or a component such as a chip in the eNB or gNB, for example.

FIG. 1 illustrates a positioning principle of an Observed Time Difference Of Arrival (OTDOA) positioning method known by the inventor. In the OTDOA positioning method, a location of a UE is estimated by transmitting positioning pilot signals through a downlink channel, and then measuring a time difference of arrival of the pilot signals of each base station at the UE.

As illustrated in FIG. 1, three base stations (an eNB 1, an eNB 2 and an eNB 3) transmit positioning pilot signals through respective downlink channels, respectively, and the UE measures arrival time $\tau_1$, $\tau_2$ and $\tau_3$. Since there is usually an offset within 20 ns between absolute times of different base stations, the method of time difference of arrival is used for performing the OTDOA positioning method. Using the eNB 1 as a reference base station, the UE calculates time differences of arrival $\tau_2$-$\tau_1$ and $\tau_3$-$\tau_1$, and feeds the time differences of arrival back to the eNB 1. A location server may estimate a location of the UE based on the time differences of arrival and the locations of the three eNBs.

Figure 2:
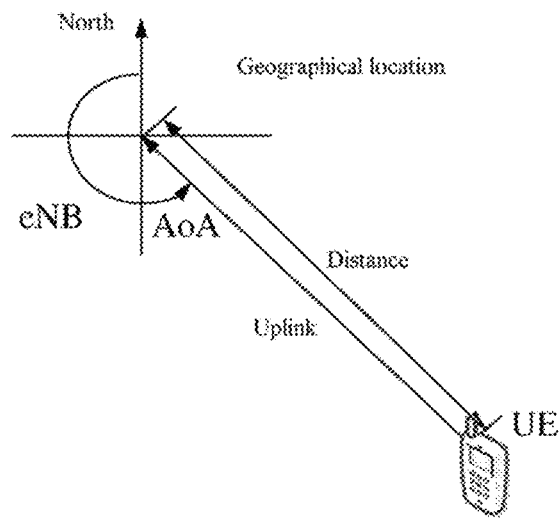
FIG. 2 is a schematic diagram illustrating a positioning principle of an Angle of Arrival (AOA)+Timing Advanced (TA) technology known by the inventor.

FIG. 2 illustrates a positioning principle of an Angle of Arrival (AOA)+Timing Advanced (TA) positioning method known by the inventor.

In the AOA+TA positioning method, a location of a UE is mainly estimated by measuring an AOA and an arrival time of an uplink signal. According to 3GPP TS 38.215, an AOA is defined as an included angle between an arrival direction of an uplink signal and a reference direction of a base station. The reference direction is a due north direction with respect to the geographical location of the base station, the angle is positive for a counterclockwise rotation, and the angle is negative for a clockwise rotation. The angle range of AOA is from 0 degree to 360 degrees, and the resolution of AOA is 0.5 degrees. As illustrated in FIG. 2, a base station (eNB) estimates an AOA of an arrival signal through an uplink channel, and calculates arrival time of the signal and a distance corresponding to the arrival time through a TA instruction in a synchronization procedure, and finally estimates a location of a UE based on the AOA and the distance.

In addition, regarding the cellular-based positioning technologies supported by the fourth generation (4G) mobile communication system, the inventor also knows the following two technologies: an Uplink Time Of Arrival (UTOA)/an Uplink Time Difference Of Arrival (UTDOA) technology and an Assistant Global Positioning System (A-GPS) technology.

In the UTOA positioning method, a base station measures time of arrival of a signal of a mobile terminal. In the method, at least three base stations are required to perform the measurement, and each base station is further provided with a Location Measuring Unit (LMU) to measure arrival time of a positioning signal sent by the terminal. Since a geographical location of each base station is known, a location of the mobile terminal may be calculated by using a spherical triangle method. For the UTDOA positioning method, a transmission time difference of a signal transmitted by a mobile terminal to different base stations is measured, rather than measuring a transmission time. The UTOA positioning method requires precise synchronization between the terminal and the base stations for positioning, while the UTDOA positioning method usually only requires synchronization between base stations for positioning. In addition, in the two positioning method, it is also required to install LMUs on all base stations, which results in a high cost.

The A-GPS positioning method is the abbreviation of a network-assisted Global Positioning System (GPS) positioning method. In the method, it is required that both a network and a mobile station are capable of receiving GPS signals. The network provides assistant GPS information to the mobile station, including information of capturing the GPS signal and assistant data on the satellite-receiver pseudorange measurement between a GPS satellite and a receiver (such as GPS capture assistant data, GPS positioning assistant information, GPS sensitivity assistant information, GPS satellite operating conditions, etc.), and assistant information to resolve a location of the mobile station such as GPS satellite ephemeris, GPS navigation message, GPS satellite almanac, etc. By using this information, the mobile station may quickly capture satellites and acquire observation data, and then transmit location measurement estimation information to a network-side positioning server, which finally calculates a location of the mobile station. Since the location calculation is performed on the network side, the complexity of the mobile station in capturing and receiving the GPS satellite signal is greatly reduced, and power consumption can be saved.

In an open environment, such as a suburb or a village, multipath and obstruction are negligible, and the positioning accuracy of the A-GPS positioning method can reach about 10 meters or even better. If the mobile station is located in an urban environment with no obstruction and a small effect of multipath, the positioning accuracy may be about 30 meters to 70 meters. If a receiving environment is located indoors or in other areas with severe multipath and heavy obstruction, it is difficult for the mobile station to capture enough satellite signals, and the capturing and positioning can not be performed with the A-GPS positioning method, which is the biggest limitation of the A-GPS positioning method. Response time of the A-GPS positioning method is slightly longer. Under a cold start, the response time of the A-GPS positioning method is 10 seconds to 30 seconds; under a normal operating condition, the response time is about 3 seconds to 10 seconds. The A-GPS positioning method has the following advantages: there are few changes on the network side, and no other devices need to be added to the network; the investment is less; and the positioning accuracy is high (which is theoretically up to 5 meters to 10 meters). The disadvantage is that the mobile station needs to support corresponding hardware and software, thereby increasing the cost and power consumption of the mobile station.

Figure 3:
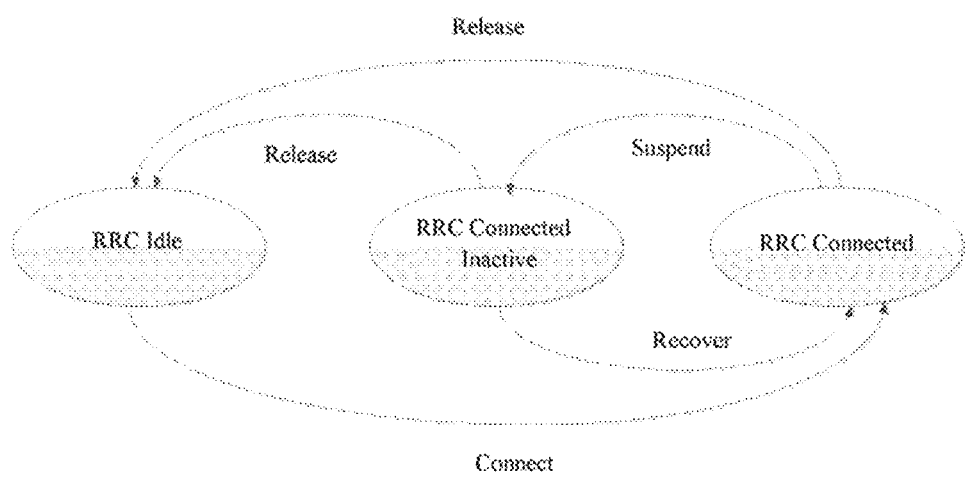
FIG. 3 is a schematic diagram illustrating state transition of the fifth generation (5G) mobile communication system.

In order to support large connections with low power consumption, a new Radio Resource Control (RRC) state, i.e., an RRC Connected Inactive state is introduced into the fifth generation (5G) mobile communication system, on the basis of the original RRC Connected state and the RRC Idle state. FIG. 3 is a diagram illustrating state transition in the 5G mobile communication system.

When the UE is in an RRC Idle state, the UE may query a paging channel to determine whether there is a network to establish a connection therewith. Since it is required to establish an RRC connection first before positioning in the conventional positioning method, the UE cannot estimate its own location when it is in the RRC Idle state. In an Inactive state, although the UE and the network maintain the RRC connection, in order to save power, most of the wireless resources are released, and only the connection for some control information is maintained. In this case, it is also required to return to the RRC Connected state to use the conventional positioning technologies. Therefore, the conventional positioning solutions cannot be applied in the Inactive state.

Figure 4:
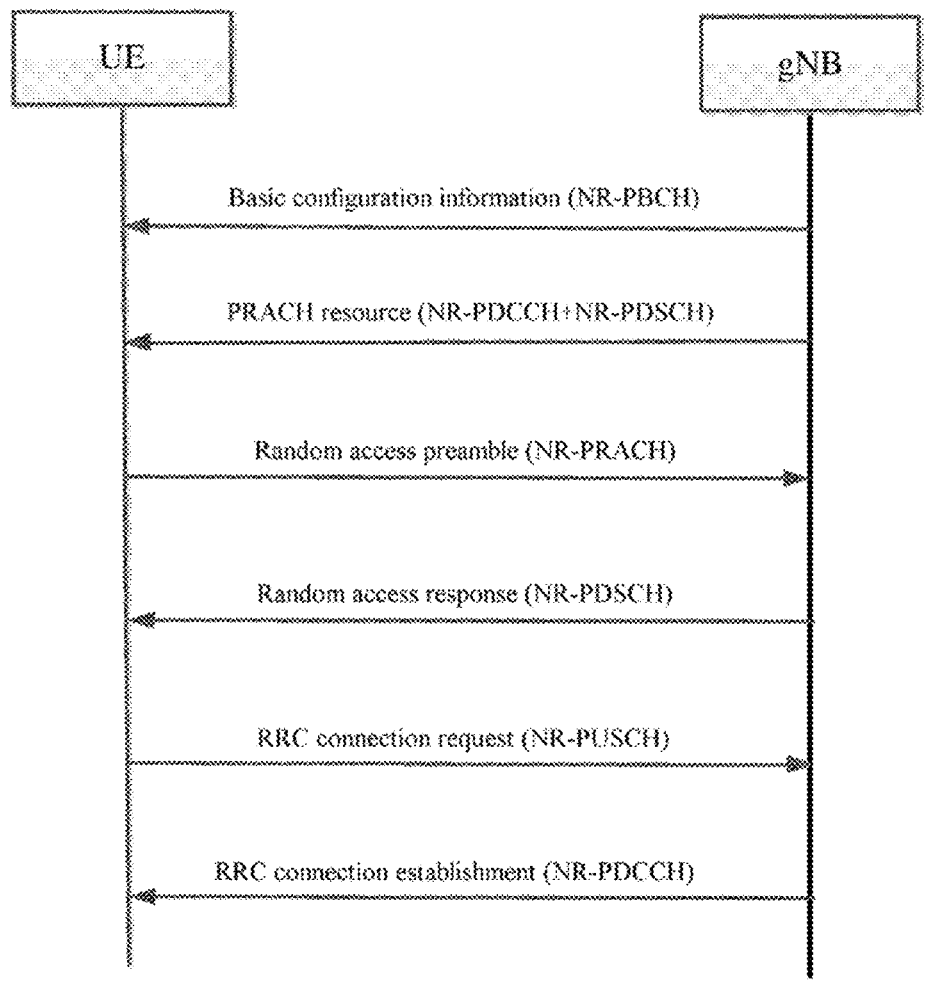
FIG. 4 is a signaling flowchart illustrating a Radio Resource Control (RRC) establishment procedure in which there is a competition.

FIG. 4 illustrates a procedure for a UE to initially access a system and establish an RRC connection in a competition state. After downlink synchronization, the UE first reads basic system information on a New Radio-Physical Broadcast Channel (NR-PBCH) and configuration information on a New Radio-Physical Downlink Control Channel (NR-PDCCH), and then reads configuration information on a New Radio-Physical Downlink Shared Channel (NR-PDSCH) about a New Radio-Physical Random Access Channel (NR-PRACH) through the NR-PDCCH. According to the requirements of this information, the UE randomly selects an access code at a corresponding time with a corresponding frequency to transmit a NR-PRACH signal, and transmits an RRC connection request after receiving a response from a base station (gNB or TRP). After the connection is established, positioning-related operations are to be initiated, and an estimated location of the UE can be obtained only after measurement and feedback. It can be seen that when the UE is in an Idle and Inactive state, if the conventional positioning technology is adopted, the positioning delay will be significantly increased and a lot of signaling resources will be consumed.

In addition, when the UE is in some special communication states, such as a Device-to-Device (D2D) or Vehicle to Everything (V2X) state, only the connection of a control channel is maintained between the UE and the base station, and data is independently transmitted among the UEs. In this case, if the conventional positioning technology is adopted, since the positioning pilot signals cannot be transmitted, the UE needs to return to an RRC Connected state in which the UE is connected to the base station.

Figure 5:
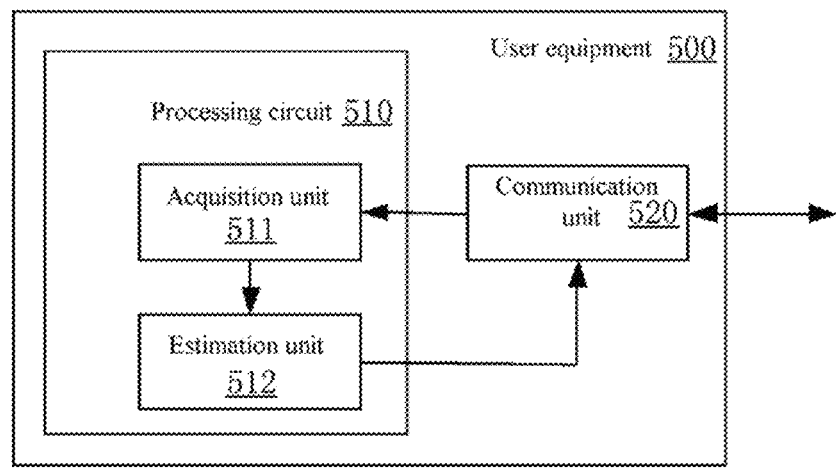
FIG. 5 is a block diagram illustrating a structure of a user equipment in a wireless communication system according to an embodiment of the present disclosure.

In order to solve at least one of the above-mentioned issues, a technical solution according to the present disclosure is provided. FIG. 5 illustrates a structure of a UE 500 in a wireless communication system according to an embodiment of the present disclosure.

As illustrated in FIG. 5, the UE 500 may include a processing circuit 510. It should be noted that the UE 500 may include one processing circuit 510 or multiple processing circuits 510. In addition, the UE 500 may further include a communication unit 520 and the like.

Further, the processing circuit 510 may include various types of discrete functional units to perform different functions and/or operations. It should be noted that the functional units may be physical entities or logical entities, and units with different names may be implemented by the same physical entity.

For example, as illustrated in FIG. 5, the processing circuit 510 may include an acquisition unit 511 and an estimation unit 512.

The acquisition unit 511 may acquire a downlink signal from an electronic equipment in the wireless communication system.

The estimation unit 512 may estimate an AOA of the downlink signal. Here, at least the AOA of the downlink signal and a location of the electronic equipment which transmits the downlink signal may be used to estimate a location of the UE 500.

It should be noted that, in the embodiment according to the present disclosure, when the location of the UE is estimated, it is unnecessary to establish an uplink between the UE and the eNB in advance. In addition, it is unnecessary for the downlink signal used to estimate the AOA to include a dedicated Positioning Reference Signal (PRS).

In order to increase the utilization rate of spectrum and power, the fifth generation (5G) mobile communication system will adopt a large-scale antenna technology on both the transmitting end and the receiving end, so that the base station can form a transmission beam, and the UE can estimate the AOA.

By using the UE 500 according to the embodiment of the present disclosure, the AOA of the downlink signal can be estimated when the UE 500 is in an RRC Idle state or an initial access state. The AOA may be used to estimate the location of the UE 500, thereby solving the problem that the UE 500 cannot be positioned in the RRC Idle state or the like.

According to a preferred embodiment of the present disclosure, when estimating the AOA, the estimation unit 512 estimates at least one of: an AOA in a first direction and an AOA in a second direction.

Preferably, the AOA in the first direction may be a horizontal AOA, which indicates an included angle between a projection of a direction of arrival of the downlink signal on a horizontal plane and a horizontal reference direction.

Further, the AOA in the second direction may be a vertical AOA, which indicates an included angle between a projection of the direction of arrival of the downlink signal on a vertical plane and a vertical reference direction.

Figure 6:
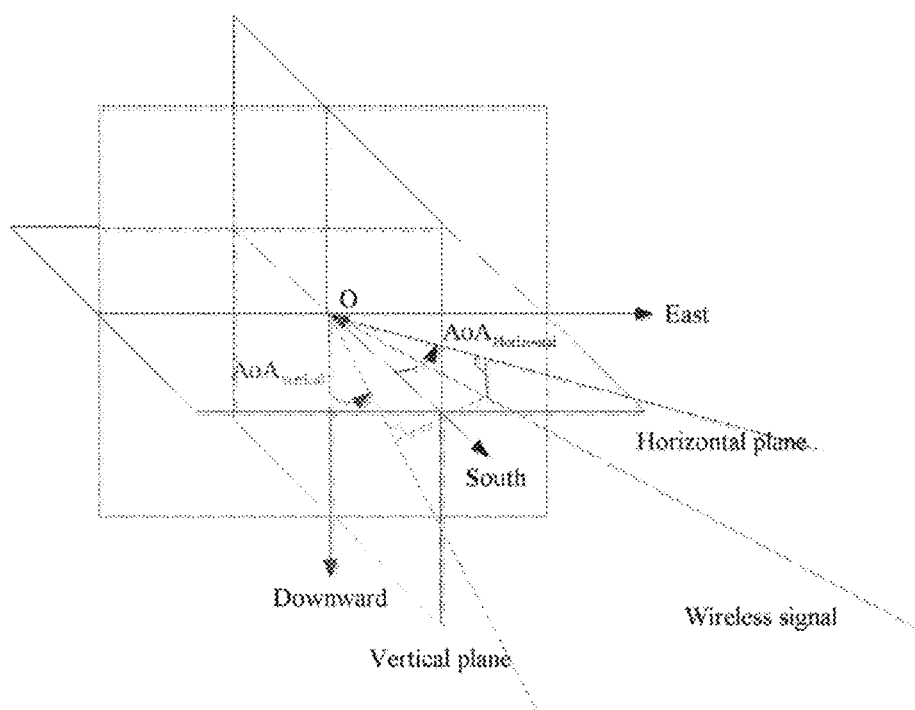
FIG. 6 is a schematic diagram illustrating a definition of an Angle of Arrival (AOA)
Figure 7:
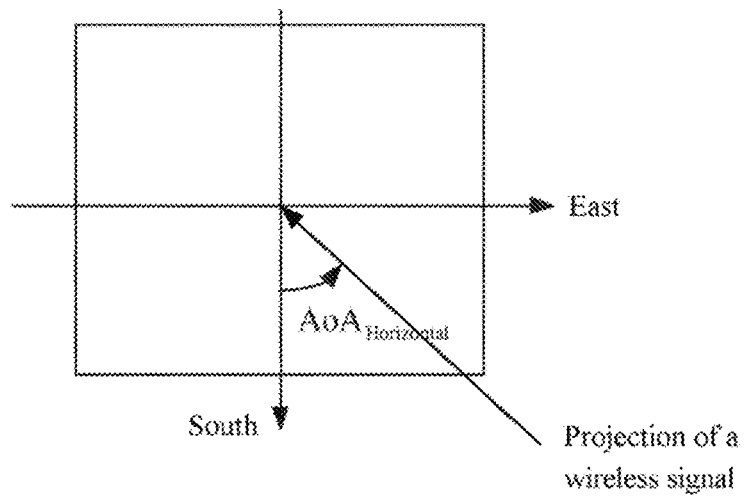
FIG. 7 is a schematic diagram illustrating a definition of a horizontal AOA.
Figure 8:
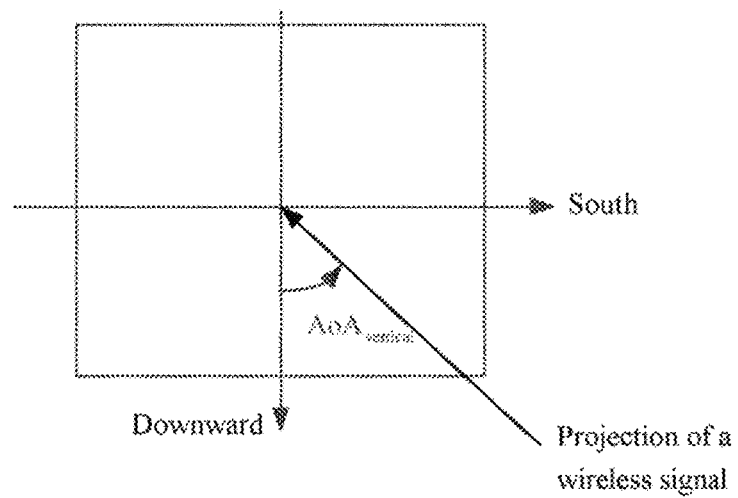
FIG. 8 is a schematic diagram illustrating a definition of a vertical AOA.

FIG. 6 illustrates an example of a definition of an AOA according to an embodiment of the present disclosure, FIG. 7 illustrates a definition of a horizontal AOA according to an embodiment of the present disclosure, and FIG. 8 illustrates a definition of a vertical AOA according to an embodiment of the present disclosure.

As illustrated in FIGS. 6 and 7, a horizontal AOA ($AOA_{Horizontal}$ in the figures) is defined as an included angle between a projection of a direction of arrival of the downlink signal on a horizontal plane and a reference direction. The reference direction may be, for example, a due south direction with respect to the geographical location of the UE, an angle for a counterclockwise rotation is positive, and an angle for a clockwise rotation is negative. The angle range of $AOA_{Horizontal}$ is from 0 degree to 360 degrees, and the resolution of $AOA_{Horizontal}$ may be, for example, 0.5 degrees. It should be noted that, in addition to taking the due south direction as the reference direction, the direction of due north or other directions in horizontal planes can also be used as the reference direction. In addition to the resolution of angle of 0.5 degrees, other angles, such as 10 degrees, may also be used as the resolution of angle.

As illustrated in FIGS. 6 and 8, a vertical AOA ($AOA_{Vertical}$ in the figures) is defined as an included angle between a projection of a direction of arrival of the downlink signal on a vertical plane and a reference direction. The reference direction may be, for example, a direction directed towards right below the earth's core at the geographical location of the UE, an angle for a counterclockwise rotation is positive, and an angle for a clockwise rotation is negative. The angle range of $AOA_{vertical}$ is from 0 degree to 360 degrees, and the resolution of $AOA_{Vertical}$ may be, for example, 0.5 degrees. It should be noted that, in addition to taking the direction directed towards right below the earth's core as the reference direction, the direction of right above or other vertical planes can also be used as the reference direction. In addition to the resolution of angle of 0.5 degrees, other angles, such as 10 degrees, can also be used as the resolution of angle.

According to a preferred embodiment of the present disclosure, the downlink signal acquired by the acquisition unit 511 may include, for example, a Synchronization Signal Block (SSB) or a Channel State Information Reference Signal (CSI-RS). Next, description is made by taking the SSB as an example of a downlink signal.

Figure 9:
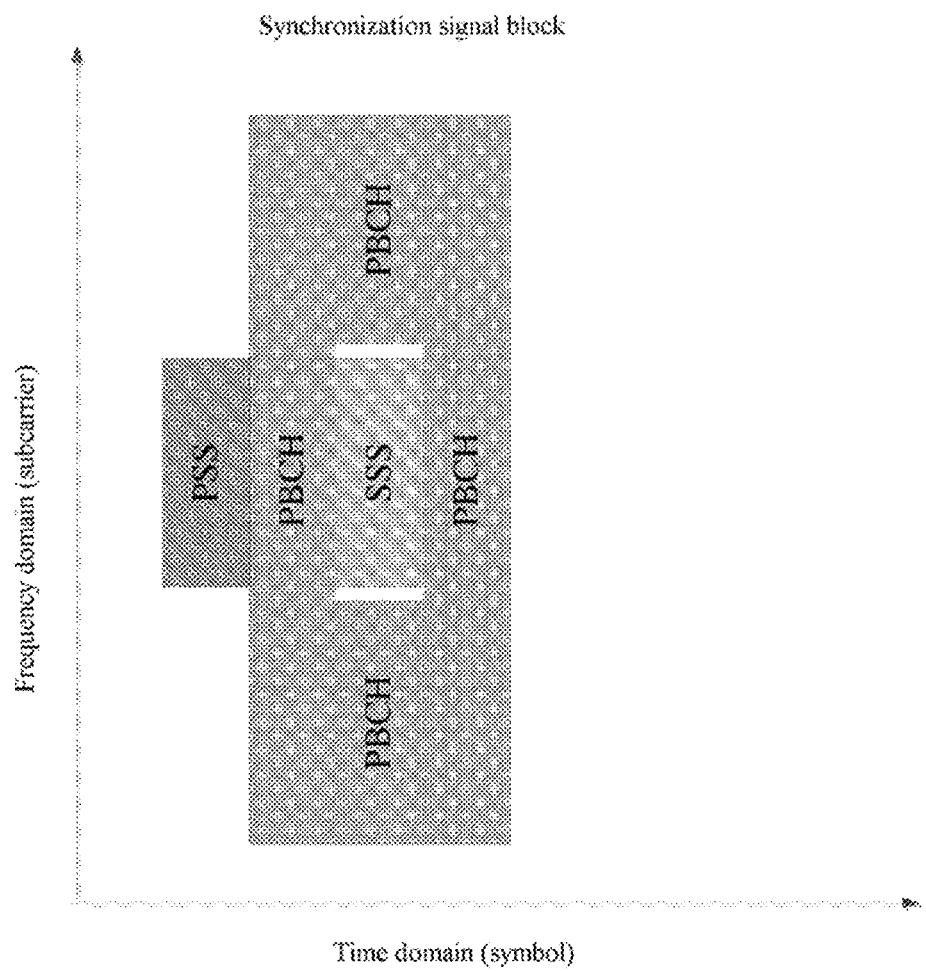
FIG. 9 is a schematic diagram illustrating an example of a synchronization signal block used in an embodiment according to the present disclosure.

FIG. 9 illustrates an example of an SSB used in an embodiment according to the present disclosure. In a 5G NR system, in order to facilitate beam scanning, a synchronization channel and a broadcast channel are combined in SSB and then are transmitted. As illustrated in FIG. 9, when a subcarrier is 15 kHz, a NR-PBCH occupies 20 physical Resource Blocks (RB) of the first and third Orthogonal Frequency Division Multiplexing (OFDM) symbols and 8 RBs of the second OFDM symbol of each slot, and a New Radio-Primary Synchronization Signal (NR-PSS) and a New Radio-Secondary Synchronization Signal (NR-SSS) occupy 127 subcarriers of the 0th and second OFDM symbols of each slot, respectively.

The present disclosure is described based on an AOA at a UE side. The UE may estimate the AOA of a downlink signal by measuring an SSB transmitted periodically, and perform positioning by acquiring a location of a base station. Since it is unnecessary to establish an RRC connection in the procedure, the positioning can be performed in both an Idle state and an Inactive state, which solves the problems of delay and a large amount of signaling overhead in the conventional technology. Table 1 lists the main differences between the solution of the present disclosure and the positioning method based on the AOA of the base station.

TABLE 1

Differences between the solution of the present disclosure and the conventional AOA solution

|  | AOA + TA | Solution of the present disclosure |
| --- | --- | --- |
| Scenario | Uplink, a base station is installed with multiple antennas | Downlink, a UE is installed with multiple antennas |
| Connected state | RRC connected state | RRC connected state, RRC Idle state and RRC connected inactive state |
| Signal | PRS | SSB or CSI-RS |
| Procedure | First establish an RRC connection, and then perform positioning | First perform positioning, and then establish an RRC connection (if it is required to report to the base station) |

It should be noted that, in the above Table 1, if it is unnecessary to report to the base station in the solution of the present disclosure, the RRC connection may not be established after positioning. The solution of the present disclosure can be applied with or without RRC connection, and a positioning request can be initiated on both a UE side and a network side, as illustrated in Table 2.

TABLE 2

Initiation of a positioning request

|  | UE end | Network end |
| --- | --- | --- |
| Without RRC connection | Directly initiate a positioning procedure | Inform a UE to initiate a positioning procedure through a Paging channel |
| With RRC connection | Inquire a base station whether to initiate a positioning procedure through a PUCCH or PUSCH, and initiate the positioning procedure after receiving a reply | Inform a UE to initiate a positioning procedure through a PDCCH or PDSCH |

When there is no RRC connection, according to the number of base stations participating in positioning, it can be divided into a positioning scenario with a single base station in no RRC Connected state and a positioning scenario with multiple base stations in no RRC Connected state. For simplicity of description, only the positioning in a horizontal plane is considered in the following, in which an AOA represents $AOA_{Horizontal}$. The positioning procedure in a vertical plane is the same as that in the horizontal plane, and is not repeated here.

Figure 10:
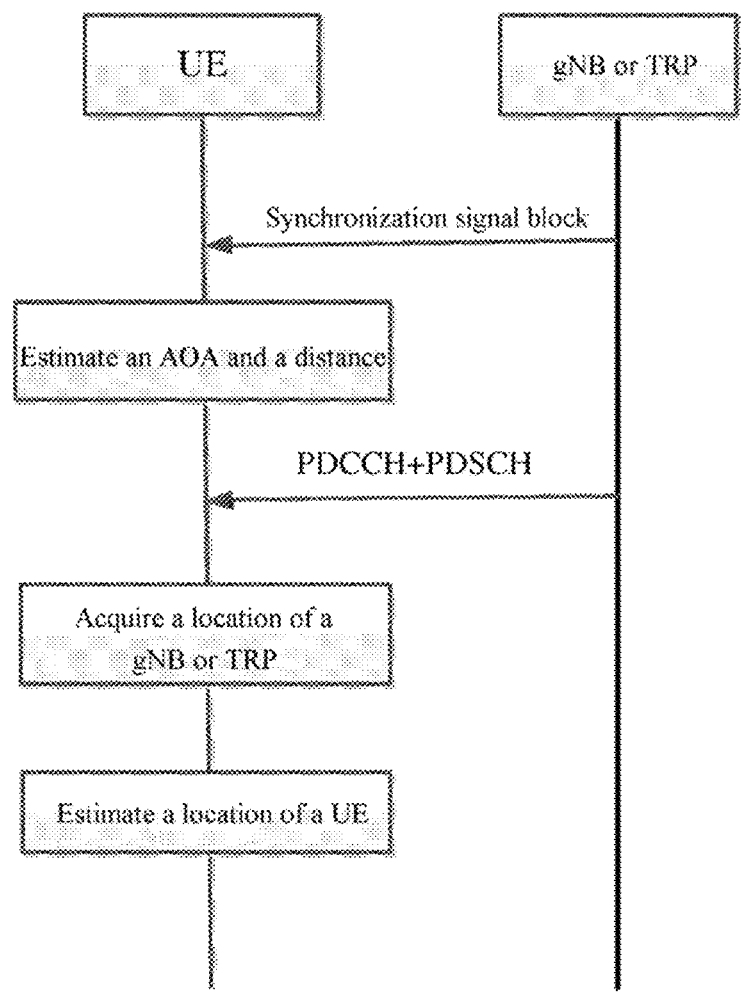
FIG. 10 is a signaling flowchart for positioning with a single base station in no RRC Connected state according to an embodiment of the present disclosure.

FIG. 10 illustrates an example for positioning with a single base station in no RRC Connected state according to an embodiment of the present disclosure. In this scenario, a UE can only receive a signal from one base station (gNB or TRP), and the UE calculates a location in no RRC Connected state.

As illustrated in FIG. 10, first, the gNB or Transmit/Receive port (TRP) transmits an SSB to the UE.

Next, the UE estimates an AOA of a downlink signal and a distance between the base station (gNB or TRP) and the UE based on the SSB.

After that, the UE acquires geographical location information of the base station (gNB or TRP) from Remaining Minimum System Information (RMSI) or Other System Information (Other SI).

Finally, the UE estimates a location of the UE based on the AOA, the distance, and the geographical location information.

The related steps in FIG. 10 are described in detail below.

In the step that the UE estimates an AOA of a downlink signal and a distance based on the SSB, the UE estimates the AOA of the downlink signal based on the SSB periodically transmitted by the base station (gNB or TRP). It is assumed that there are N antennas on a UE side, a separation distance between antennas is $\lambda/2$, and $\lambda$ is a wavelength of a carrier frequency. Without considering a noise, a reception signal may be expressed as:

$$y(t) = \begin{bmatrix} y_0(t) \\ y_1(t) \\ \vdots \\ y_{N-1}(t) \end{bmatrix} = r(t)a(\phi) \quad (1)$$

where $y_n(t)$ represents a reception signal on the n-th antenna (n=0, 1, ..., N−1), r(t) represents a synchronization signal to the UE. In addition, $$a(\phi)=[1, e^{j\pi i\omega(\phi)}, xox, e^{j\pi(N-1)sin(\phi)}]^T \quad (2)$$

represents a Response vector of an antenna array. $\phi$ represents an Angle of Arrival of a signal. By dividing the second element by the first element in y(t), the following may be obtained:

$$z = \frac{y_1(t)}{y_0(t)} = e^{j\pi sin(\phi)} \quad (3)$$

Then the Angle of Arrival $\phi$ may be calculated by estimating a phase angle of z. In order to improve the estimation accuracy, some advanced signal processing technologies such as a Multiple Signal Classification (MUSIC) and an Estimation of Signal Parameters via Rotation Invariant Technique (ESPRIT) may also be adopted.

In addition, since a transmission power of the SSB is predetermined and remains unchanged in a cell, the UE may estimate the distance between the UE and the base station (gNB or TRP) based on a reception power. However, other forms of estimation methods may also be used in the present disclosure, such as a Time of Arrival (TOA) method.

Next, a specific manner for the UE to acquire the geographical location information of the base station (gNB or TRP) is described in detail.

In the 5G mobile communication system, system information is acquired in a hierarchical manner. The basic cell configuration information is provided by a Physical Broadcast Channel (PBCH), and a shared channel further provides more system information. For example, complete information can be obtained through the following steps:

1) the UE acquires the PBCH that provides the basic cell configuration and determines a downlink control channel (which schedules the shared channel);

2) the UE acquires the Minimum System Information (RMSI) that provides scheduling information for all other system information blocks; and 3) the UE acquires other required system information (Other SI).

Therefore, the geographical location information of the base station (gNB or TRP) may be stored in the RMSI or Other SI, for example.

In addition to the RMSI and Other SI, a case that the geographical location information of the base station (gNB or TRP) is stored in a NR-PBCH is also included in the present disclosure. In addition, there is also a possibility that the geographical location information of the base station (gNB or TRP) is transmitted through a NR-PDSCH as On-demand other SI.

In summary, Table 3 illustrates a location where location information of a base station (gNB or TRP) may be stored and an acquisition method.

TABLE 3

Methods for acquiring location information of a base station

| Location for storage | Physical channel | Acquisition method |
|---|---|---|
| Basic configuration information | PBCH | Directly acquire after downlink synchronization |
| Minimum System Information (RMSI) | PDSCH | 1) a UE acquires a PBCH that provides a basic cell configuration and determines a downlink control channel (which schedules a shared channel); 2) the UE acquires the Minimum System Information (RMSI) that provides scheduling information for all other system information blocks. |
| Other System Information (Other SI) | PDSCH | 1) a UE acquires a PBCH that provides a basic cell configuration and determines a downlink control channel (which schedules a shared channel); 2) the UE acquires the Minimum System Information (RMSI) that provides scheduling information for all other system information blocks; 3) the UE acquires other required system information (Other SI) through configuration information provided by the RMSI. |
| Other System Information (Other SI) | PRACH, PDSCH | 1) a UE initiates a request to a base station through a Random Access Channel (PRACH) to obtain location information of the base station; 2) the UE acquires the location information transmitted to the user by the base station in Other SI. |
| User data information | PRACH, PDSCH | 1) a UE initiates a request to a base station through a Random Access Channel (PRACH) to establish an RRC connection; 2) the base station allocates a downlink physical resource to the UE; 3) the UE acquires location information in a PDSCH. |

For the form of geographical location information of the base station (gNB or TRP), for example, absolute coordinates may be used, which is represented by longitude, latitude, and altitude from sea level; relative coordinates may also be used, with a reference object in a cell as a coordinate origin, and a relative distance from it on horizontal and vertical planes as a position coordinate. In addition, other forms of geographical location information may also be used in the present disclosure, such as absolute coordinates used for altitude and relative coordinates used for positions on a horizontal plane.

Figure 11:
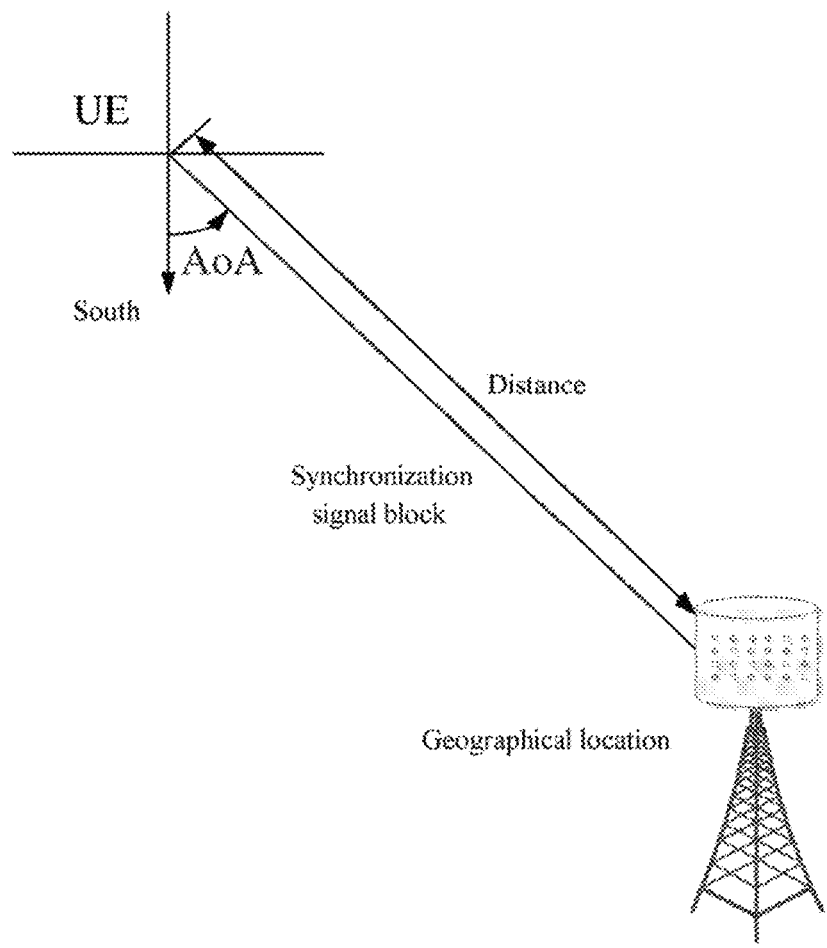
FIG. 11 is a schematic diagram for positioning with a single base station in no RRC Connected state according to an embodiment of the present disclosure.

FIG. 11 illustrates a schematic diagram for positioning with a single base station in no RRC Connected state according to an embodiment of the present disclosure. As illustrated in FIG. 11, a UE may estimate a location of the UE based on an AOA, a distance, and a geographical location of a base station.

According to a preferred embodiment of the present disclosure, the estimation unit 512 may estimate a distance between an electronic equipment and the UE 500 based on a downlink signal from the electronic equipment. Further, the estimation unit 512 may estimate a relative location of the UE 500 based on the estimated distance and the estimated AOA of the downlink signal. The relative location refers to a location of the UE 500 relative to the electronic equipment (i.e., gNB or TRP).

According to a preferred embodiment of the present disclosure, electronic equipment geographical location information indicating a location of an electronic equipment may be transmitted by the electronic equipment to the UE 500. In this case, the estimation unit 512 may estimate an actual location of the UE 500 based on the distance, the AOA and the location of the electronic equipment.

As mentioned above, in the technical solution according to the embodiment of the present disclosure, the UE may be connectionless with the electronic equipment which transmits the downlink signal and in an RRC idle state, or may be in connection with the electronic equipment but in an RRC inactive state.

In the above, the scenario where the UE can only receive a signal from one base station (gNB or TRP) is described. Next, a scenario where the UE can receive signals from multiple base stations (gNB or TRP) is described.

According to a preferred embodiment of the present disclosure, when downlink signals from multiple electronic equipments are received, an estimation unit 512 may estimate an AOA of a first electronic equipment of the multiple electronic equipments, and may estimate an AOA of a second electronic equipment of the multiple electronic equipments. Here, the AOA of the first electronic equipment, the AOA of the second electronic equipment, a location of the first electronic equipment and a location of the second electronic equipment may be used to estimate a location of the UE 500.

Figure 12:
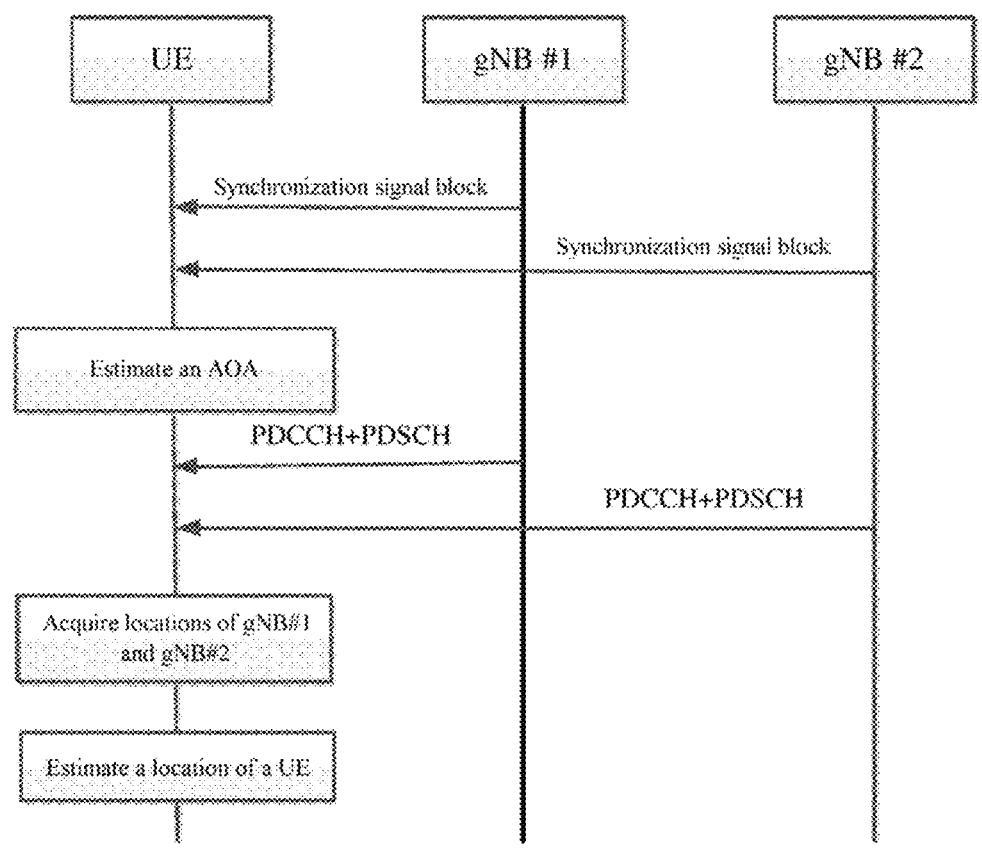
FIG. 12 is a signaling flowchart for positioning with multiple base stations in no RRC Connected state according to an embodiment of the present disclosure.

FIG. 12 illustrates an example for positioning with multiple base stations in no RRC Connected state according to an embodiment of the present disclosure. As illustrated in FIG. 12, a UE may receive signals from multiple base stations (taking two base stations as an example), and a location is calculated on the UE side in no RRC Connected state.

Specifically, first, the UE estimates an AOA of a downlink signal of each base station based on an SSB.

Next, the UE acquires geographical location information of each base station from RMSI or Other SI of the base station, for example.

After that, the UE may estimate a location of the UE based on the AOA and the geographical location information.

In the step that a UE estimates an AOA of a downlink signal of each base station based on an SSB, a method for estimating the AOA of the downlink signal of each base station is similar to the solution of the above-mentioned method for positioning with a single base station in no RRC Connected state, which is not repeated here.

It should be noted that, in the method for positioning with multiple base stations in no RRC Connected state, it is unnecessary to estimate a distance between the UE and the base station.

In the step that the UE acquires geographical location information of each base station from RMSI or Other SI of the base station, the solution is similar to the solution of the method for positioning with a single base station in no RRC Connected state, which is not repeated here.

Figure 13:
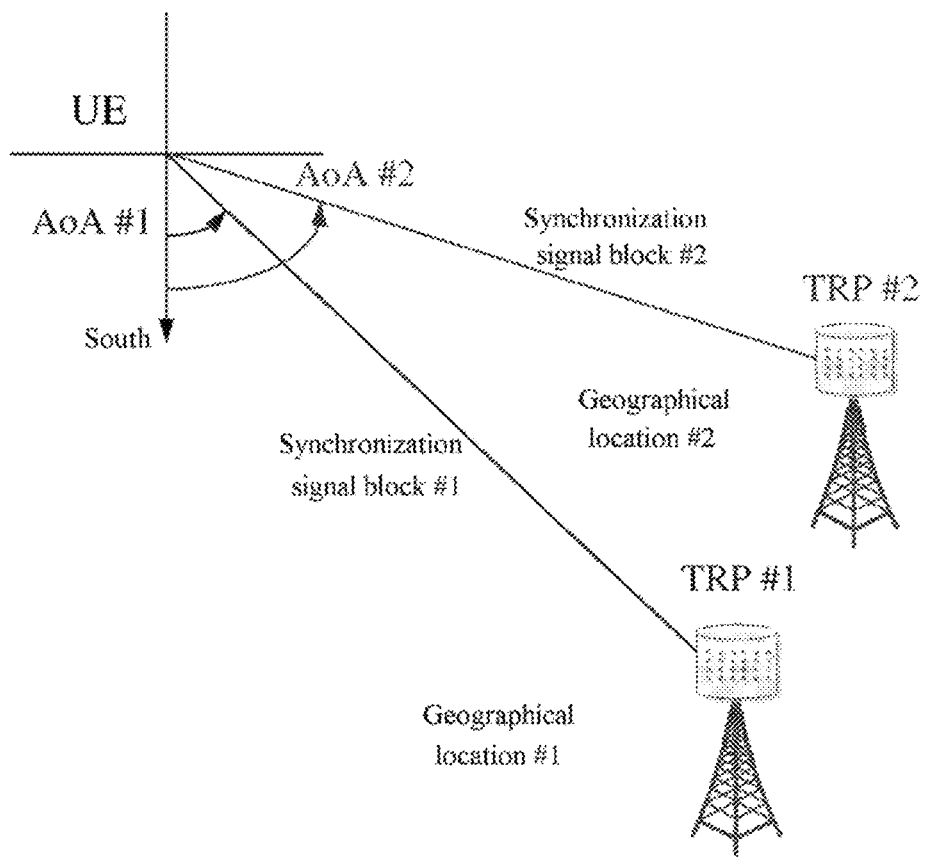
FIG. 13 is a schematic diagram for positioning with multiple base stations in no RRC Connected state according to an embodiment of the present disclosure.

FIG. 13 illustrates a schematic diagram for positioning with multiple base stations in no RRC Connected state according to an embodiment of the present disclosure. As illustrated in FIG. 13, a UE may estimate a location of the UE based on an AOA and geographical location information of each base station.

In a technical solution according to an embodiment of the present disclosure, positioning of the UE may be performed by the UE or a base station. Next, a scenario where a base station performs positioning of the UE is described. In a case that the base station performs positioning of the UE, an RRC connection is generally required.

When there is an RRC connection, the solution may be divided into positioning after establishment of the RRC connection and establishing the RRC connection after positioning according to the order of performing positioning and establishment of RRC connection. For simplicity of description, only the positioning in a horizontal plane is described in the following, in which an AOA represents $AOA_{Horizontal}$. The positioning procedure in a vertical plane is similar to that in the horizontal plane, and is not repeated here.

Figure 14:
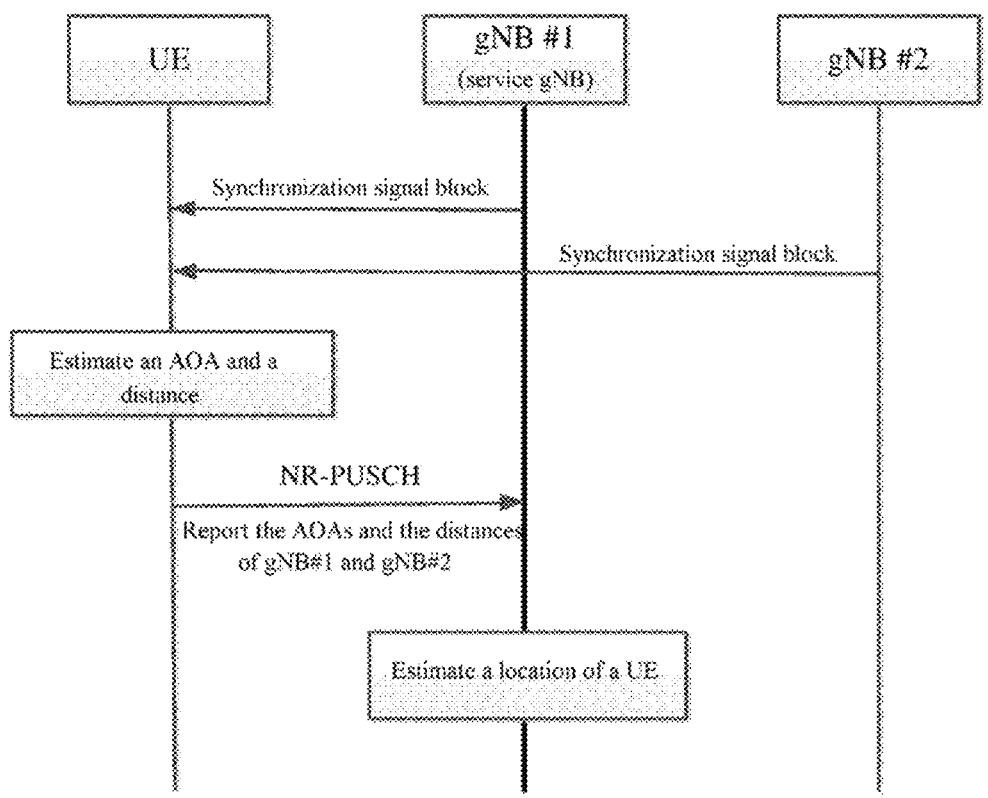
FIG. 14 is a signaling flowchart for positioning with multiple base stations in an RRC Connected state according to an embodiment of the present disclosure.

FIG. 14 illustrates an example for positioning with multiple base stations in an RRC Connected state according to an embodiment of the present disclosure, which represents a scenario of performing positioning after establishment of RRC connection. In this scenario, the UE is in an RRC Connected state and may receive signals from multiple base stations (taking two base stations as an example). The UE feeds back measurement information to a service base station, and the service base station calculates a location of the UE.

As illustrated in FIG. 14, first, the UE estimates an AOA and a distance from each base station based on an SSB of each base station.

Next, the UE reports the AOA of and the distance from each base station to a service base station.

After that, the service base station estimates a location of the UE based on the reported AOA and distance as well as geographical location information of each base station.

In the step that a UE estimates an AOA and a distance from each base station based on an SSB of each base station, a method for estimating an AOA of a downlink signal of each base station and a procedure for estimating a distance are similar to the solution of the method for positioning with a single base station in no RRC Connected state.

In the step that the UE reports the AOA of and the distance from each base station to a service base station, since there is an RRC Connected state with the service base station, the UE may report the measured AOA of and distance from each base station to the service base station through an Uplink Shared Channel (NR-PUSCH).

In the step that the service base station estimates a location of the UE based on the reported AOA and distance as well as geographical location information of each base station, the service base station estimates the location of the UE based on the AOA of and the distance from each base station as well as geographical location information known on a base station side. In the positioning calculation procedure, advanced digital signal processing methods, such as the Minimum Mean Square Error (MMSE) algorithm, may be adopted to improve the estimation accuracy.

According to a preferred embodiment of the present disclosure, in the scenario where the UE may receive signals from multiple base stations (gNB or TRP), after the estimation unit 512 estimates the AOA of the first electronic equipment and the AOA of the second electronic equipment, the processing circuit 510 may cause the UE 500 to transit to an RRC connected sate. Further, the processing circuit 510 may further transmit information on the AOA of the first electronic equipment and information on the AOA of the second electronic equipment to a service base station of the UE 500, so as to estimate the location of the UE 500 by the service base station based on the AOA of the first electronic equipment, the AOA of the second electronic equipment, a location of the first electronic equipment and a location of the second electronic equipment. Here, the service base station may be determined by the base station reported by the UE, the base station to which the UE reports is determined as the service base station, and the first electronic equipment may generally be regarded as the service base station.

Figure 15:
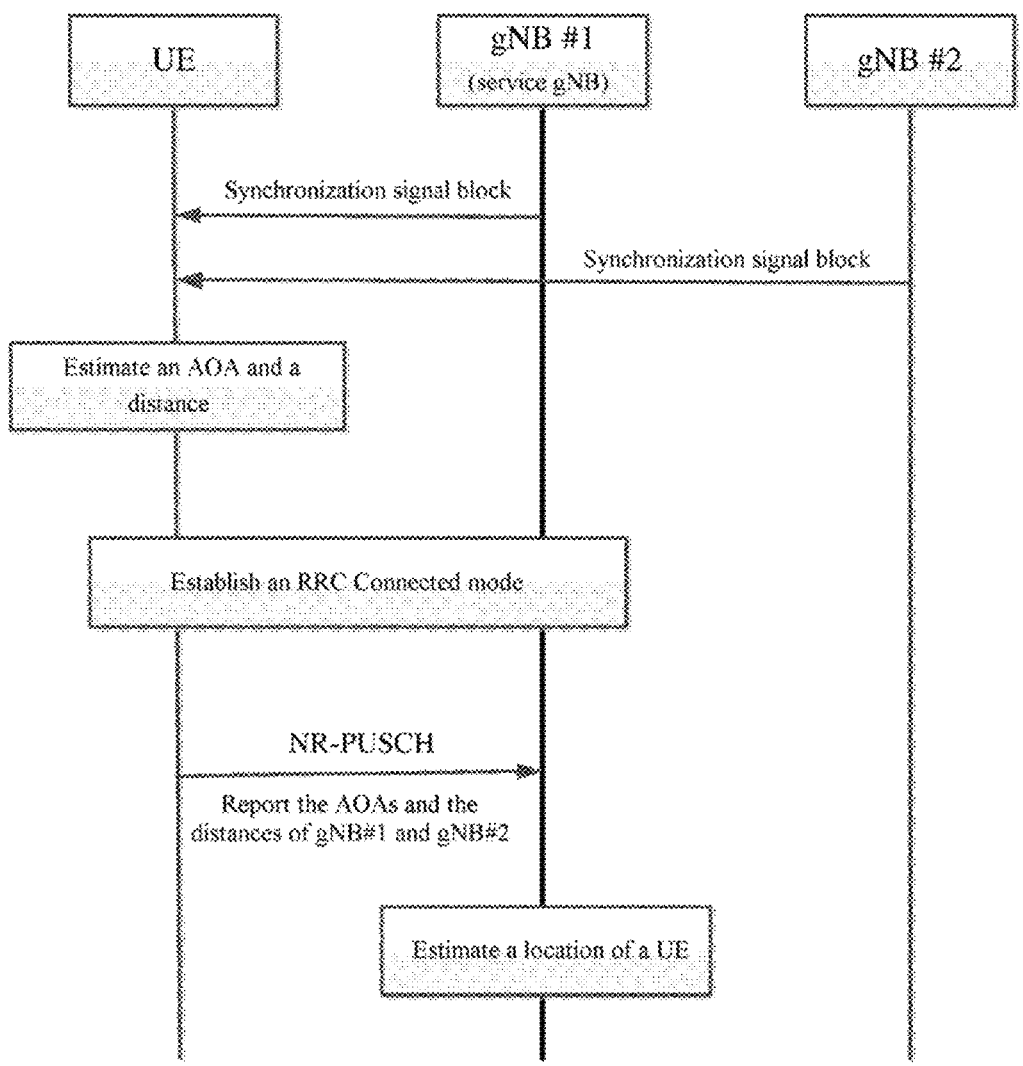
FIG. 15 is a signaling flowchart for positioning in a case of establishing an RRC connection according to an embodiment of the present disclosure.

FIG. 15 illustrates an example for positioning in a case of establishing an RRC connection according to an embodiment of the present disclosure, which represents a scenario of establishing the RRC connection after positioning. In this scenario, the UE is in an RRC Idle state and may receive signals from multiple base stations (taking two base stations as an example). The UE establishes an RRC connection with a service base station, and feeds back measurement information to the service base station, and the service base station calculates a location of the UE.

As illustrated in FIG. 15, first, the UE estimates an AOA and a distance from each base station based on an SSB of each base station.

Next, the UE establishes an RRC connection with the service base station.

Then, the UE reports the AOA of and the distance from each base station to the service base station.

After that, the service base station estimates a location of the UE based on the reported AOA and distance as well as geographical location information of each base station.

In the step that the UE estimates an AOA and a distance from each base station based on an SSB of each base station, a method for estimating an AOA of a downlink signal of each base station and a procedure for estimating a distance are similar to the solution of the method for positioning with a single base station in no RRC Connected state.

In the step that the UE establishes an RRC connection with a service base station, as illustrated in FIG. 4, after synchronizing with a synchronization channel, the UE first acquires basic system information on a NR-PBCH and configuration information on a NR-PDCCH, and then acquires configuration information on a NR-PDSCH about a NR-PRACH through the NR-PDCCH. According to the requirements of this information, the UE randomly selects an access code at a corresponding time with a corresponding frequency to transmit a NR-PRACH signal, and transmits an RRC connection request after receiving a response from a base station. After the service base station agrees, the RRC connection is established.

In the step that the UE reports the AOA of and the distance from each base station to the service base station, since there is an RRC Connected state with the service base station, the UE may report the measured AOA of and distance from each base station to the service base station through an Uplink Shared Channel (NR-PUSCH).

In the step that the service base station estimates a location of the UE based on the reported AOA and distance as well as geographical location information of each base station, the service base station estimates the location of the UE based on the AOA of and the distance from each base station as well as geographical location information known on a base station side. In the positioning calculation procedure, advanced digital signal processing methods, such as the Minimum Mean Square Error (MMSE) algorithm, may be adopted to improve the estimation accuracy.

It should be noted that, according to an embodiment of the present disclosure, the UE 500 may further include a massive Multiple-Input Multiple-Output (MIMO) antenna array. In addition, the wireless communication system as described above may be a 5G New Radio NR system, and the electronic equipment as described above may be a base station or a TRP.

The solutions according to the embodiments of the present disclosure may be performed in the RRC Idle state and the Inactive state, or in the RRC Connected state, and may also be performed in special communication scenarios such as D2D. In the solutions according to the embodiments of the present disclosure, the positioning delay can be reduced, the positioning pilot signals are not required, and a large amount of signaling resources can also be saved.

Next, an electronic equipment 1600 in a wireless communication system according to another embodiment of the present disclosure is described with reference to FIG. 16.

Figure 16:
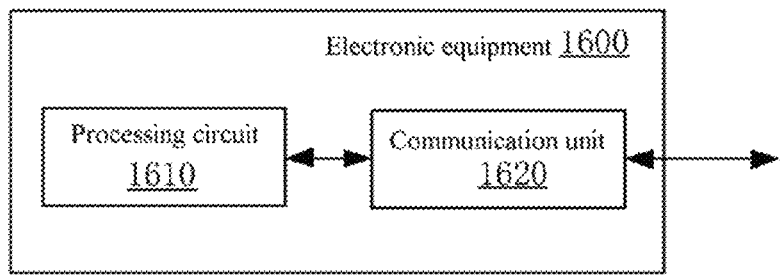
FIG. 16 is a block diagram illustrating a structure of an electronic equipment in a wireless communication system according to another embodiment of the present disclosure.

FIG. 16 illustrates a structure of the electronic equipment 1600 in a wireless communication system according to another embodiment of the present disclosure.

As illustrated in FIG. 16, the electronic equipment 1600 may include a processing circuit 1610. It should be noted that the electronic equipment 1600 may include one processing circuit 1610 or multiple processing circuits 1610. In addition, the electronic equipment 1600 may further include a communication unit 1620 such as a transceiver and the like.

As mentioned above, similarly, the processing circuit 1610 may also include various types of discrete functional units to perform different functions and/or operations. The functional units may be physical entities or logical entities, and units with different names may be implemented by a same physical entity.

The processing circuit 1610 may cause the communication unit 1620 to transmit a downlink signal, such that a UE in the wireless communication system estimates an AOA of the downlink signal. Here, at least the AOA and a location of the electronic equipment 1600 may be used to estimate a location of the UE.

Preferably, the downlink signal may include an SSB or a CSI-RS.

Preferably, the processing circuit 1610 may cause the communication unit 1620 to transmit geographical location information indicating the location of the electronic equipment 1600 to the UE.

Preferably, the UE may be connectionless with the electronic equipment 1600 and in an RRC idle state, or may be in connection with the electronic equipment 1600 but in an RRC inactive state. In this case, the processing circuit 1610 may establish an RRC connection with the UE; cause the communication unit 1620 to receive, from the UE, a first AOA of a downlink signal from the electronic equipment 1600 and a second AOA of a downlink signal from another electronic equipment; and estimate the location of the UE based on the first AOA, the second AOA, the location of the electronic equipment 1600 and a location of the another electronic equipment.

Preferably, the UE may be in an RRC connection state. In this case, the processing circuit 1610 may cause the communication unit 1620 to receive, from the UE, a first AOA of a downlink signal from the electronic equipment 1600 and a second AOA of a downlink signal from another electronic equipment; and estimate the location of the UE based on the first AOA, the second AOA, the location of the electronic equipment 1600 and a location of the another electronic equipment.

It should be noted that according to the embodiment of the present disclosure, the wireless communication system as described above may be a 5G New Radio NR system, and the electronic equipment 1600 may be a base station or a TRP.

Figure 17:
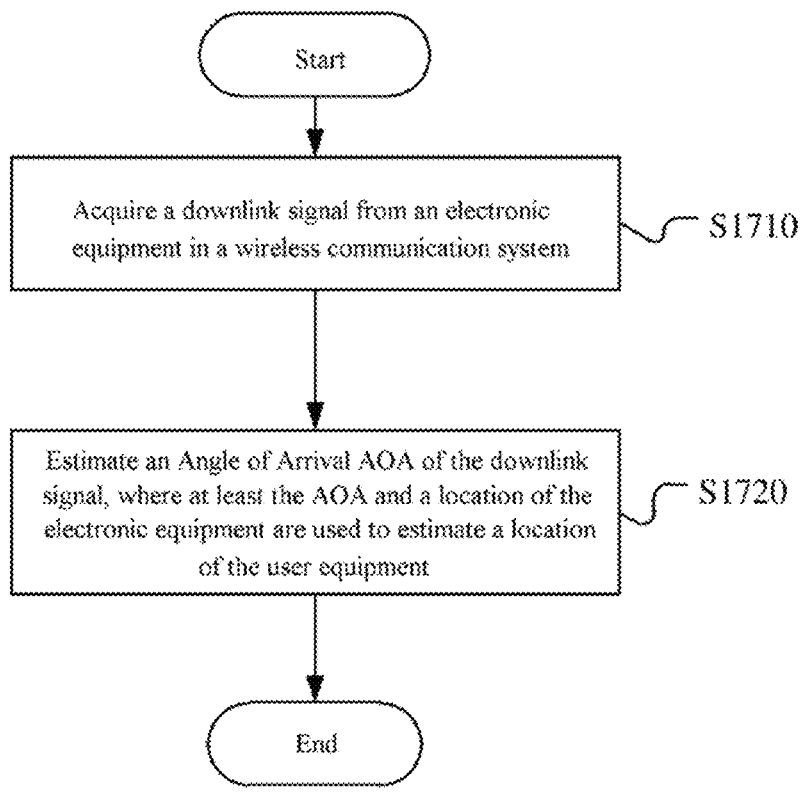
FIG. 17 is a flowchart illustrating a wireless communication method according to an embodiment of the present disclosure.

Next, a method for performing wireless communication in a wireless communication system according to an embodiment of the present disclosure is described with reference to FIG. 17. FIG. 17 illustrates a flowchart of a wireless communication method according to an embodiment of the present disclosure.

As illustrated in FIG. 17, first, in step S1710, a downlink signal from an electronic equipment in the wireless communication system is acquired.

Then, in step S1720, an AOA of the downlink signal is estimated. Here, at least the AOA and a location of the electronic equipment may be used to estimate a location of the UE.

Preferably, the downlink signal may include an SSB or a CSI-RS.

Preferably, estimating the AOA may at least include one of: estimating an AOA in a first direction and estimating an AOA in a second direction.

Preferably, the AOA in the first direction may be a horizontal AOA, which indicates an included angle between a projection of a direction of arrival of the downlink signal on a horizontal plane and a horizontal reference direction, the AOA in the second direction may be a vertical AOA, which indicates an included angle between a projection of the direction of arrival of the downlink signal on a vertical plane and a vertical reference direction.

Preferably, in the method according to an embodiment of the present disclosure, a distance between the electronic equipment and the UE may be further estimated based on the downlink signal, and a relative location of the UE may be estimated based on the distance and the AOA.

Preferably, electronic equipment geographical location information indicating the location of the electronic equipment may be transmitted by the electronic equipment to the UE, and in the method according to an embodiment of the present disclosure, an actual location of the UE may be further estimated based on the distance, the AOA and the location of the electronic equipment.

Preferably, the UE may be connectionless with the electronic equipment and in an RRC idle state, or may be in connection with the electronic equipment but in an RRC inactive state.

Preferably, when downlink signals from multiple electronic equipments are received, in the method according to an embodiment of the present disclosure, an AOA of a first electronic equipment of the multiple electronic equipments may be further estimated, and an AOA of a second electronic equipment of the multiple electronic equipments may be estimated. Here, the AOA of the first electronic equipment, the AOA of the second electronic equipment, a location of the first electronic equipment and a location of the second electronic equipment may be used to estimate the location of the UE.

Preferably, after estimating the AOA of the first electronic equipment and the AOA of the second electronic equipment, in the method according to an embodiment of the present disclosure, the UE may be further caused to transit to an RRC connected sate, and information on the AOA of the first electronic equipment and information on the AOA of the second electronic equipment may be transmitted to a service base station of the UE, so as to estimate the location of the UE by the service base station based on the AOA of the first electronic equipment, the AOA of the second electronic equipment, the location of the first electronic equipment and the location of the second electronic equipment.

According to another embodiment of the present disclosure, a method for performing wireless communication in a wireless communication system is further provided. The method may include: transmitting a downlink signal by an electronic equipment in the wireless communication system, such that a UE in the wireless communication system estimates an AOA of the downlink signal. Here, at least the AOA and a location of the electronic equipment may be used to estimate a location of the UE.

Preferably, the downlink signal may include an SSB or a CSI-RS.

Preferably, in the method according to an embodiment of the present disclosure, geographical location information indicating the location of the electronic equipment may be further transmitted to the UE.

Preferably, the UE may be connectionless with the electronic equipment and in an RRC idle state, or may be in connection with the electronic equipment but in an RRC inactive state. In this case, in the method according to an embodiment of the present disclosure, an RRC connection with the UE may be further established, a first AOA of a downlink signal from the electronic equipment and a second AOA of a downlink signal from another electronic equipment may be received from the UE, and the location of the UE may be estimated based on the first AOA, the second AOA, the location of the electronic equipment and a location of the another electronic equipment.

Preferably, the UE may be in an RRC connection state. In this case, in the method according to an embodiment of the present disclosure, a first AOA of a downlink signal from the electronic equipment and a second AOA of a downlink signal from another electronic equipment may be further received from the UE, and the location of the UE may be estimated based on the first AOA, the second AOA, the location of the electronic equipment and a location of the another electronic equipment.

Various specific implementations of the above steps of the method for performing wireless communication in the wireless communication system according to the embodiments of the present disclosure are described in detail above, which are not repeated here.

In addition, it should be noted that, according to another embodiment of the present disclosure, a computer readable storage medium is further provided. The storage medium may include executable computer instructions that, when executed by a computer, cause the computer to execute the method according to the embodiment of the present disclosure.

The technology according to the present disclosure may be applied into various products. For example, a base station mentioned in the present disclosure may be implemented as any type of evolved Node B (eNB) such as a macro eNB and a small eNB. The small eNB may be an eNB such as a pico eNB, a micro eNB, and a home (femto) eNB that covers a cell smaller than a macro cell. Instead, the base station may be implemented as any other types of base stations such as a NodeB and a base transceiver station (BTS). The base station may include: a main body (which is also referred to as a base station device) configured to control wireless communication; and one or more remote radio heads (RRH) arranged at different positions from the main body. In addition, various types of terminals, which will be described below, may each operate as the base station by temporarily or semi-persistently executing a base station function.

For example, a UE mentioned in the present disclosure may be implemented as a mobile terminal (such as a smartphone, a tablet personal computer (PC), a notebook PC, a portable game terminal, a portable/dongle type mobile router, and a digital camera), or an in-vehicle terminal (such as a vehicle navigation device). The UE may also be implemented as a terminal (which is also referred to as a machine type communication (MTC) terminal) that performs machine-to-machine (M2M) communication. Furthermore, the UE may be a wireless communication module (such as an integrated circuit module including a single die) mounted on each of the terminals described above.

Figure 18:
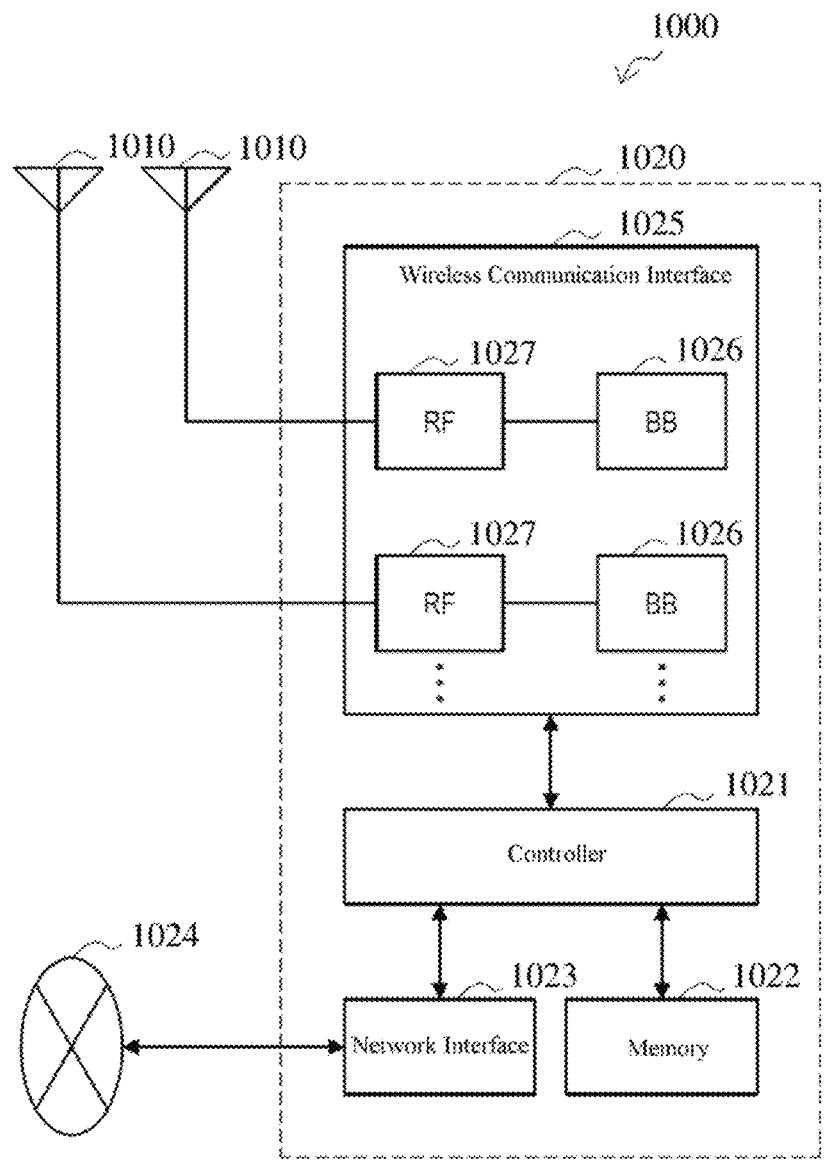
FIG. 18 is a block diagram illustrating a first example of a schematic configuration of an evolution Node Base Station (eNB) or a gNB (a base station in the fifth-generation communications system) to which the present disclosure is applied.

FIG. 18 is a block diagram illustrating a first example of a schematic configuration of an eNB to which the technology according to the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a multiple input multiple output (MIMO) antenna), and is used for the base station device 1020 to transmit and receive wireless signals. The eNB 1000 may include the multiple antennas 1010, as illustrated in FIG. 18. For example, the multiple antennas 1010 may be compatible with multiple frequency bands used by the eNB 1000. Although FIG. 18 illustrates the example in which the eNB 1000 includes the multiple antennas 1010, the eNB 1000 may also include a single antenna 1010.

The base station device 1020 includes a controller 1021, a memory 1022, a network interface 1023, and a wireless communication interface 1025.

The controller 1021 may be, for example, a CPU or a DSP, and operates various functions of a higher layer of the base station device 1020. For example, the controller 1021 generates a data packet based on data in signals processed by the wireless communication interface 1025, and transfers the generated packet via the network interface 1023. The controller 1021 may bundle data from multiple base band processors to generate the bundled packet, and transfer the generated bundled packet. The controller 1021 may have logical functions of performing control such as radio resource control, radio bearer control, mobility management, admission control, and scheduling. The control may be performed in corporation with an eNB or a core network node in the vicinity. The memory 1022 includes an RAM and an ROM, and stores a program that is executed by the controller 1021, and various types of control data (such as a terminal list, transmission power data, and scheduling data).

The network interface 1023 is a communication interface for connecting the base station device 1020 to a core network 1024. The controller 1021 may communicate with a core network node or another eNB via the network interface 1023. In this case, the eNB 1000, and the core network node or the other eNB may be connected to each other via a logical interface (such as an S1 interface and an X2 interface). The network interface 1023 may also be a wired communication interface or a wireless communication interface for wireless backhaul. If the network interface 1023 is a wireless communication interface, the network interface 1023 may use a higher frequency band for wireless communications than the wireless communication interface 1025.

The wireless communication interface 1025 supports any cellular communication scheme (such as Long Term Evolution (LTE) and LTE-Advanced), and provides a wireless connection to a terminal located in a cell of the eNB 1000 via the antenna 1010. The wireless communication interface 1025 may typically include, for example, a baseband (BB) processor 1026 and an RF circuit 1027. The BB processor 1026 may perform, for example, encoding/decoding, modulating/demodulating, and multiplexing/de-multiplexing, and perform various types of signal processing of layers (such as L1, medium access control (MAC), radio link control (RLC), and a packet data convergence protocol (PDCP)). Instead of the controller 1021, the BB processor 1026 may perform a part or all of the above described logical functions. The BB processor 1026 may be a memory that stores a communication control program, or a module that includes a processor and a related circuit configured to execute the program. Updating the program may allow the functions of the BB processor 1026 to be changed. The module may be a card or a blade that is inserted into a slot of the base station device 1020. Alternatively, the module may also be a chip that is mounted on the card or the blade. In addition, the RF circuit 1027 may include, for example, a frequency mixer, a filter and an amplifier, and transmit and receive wireless signals via the antenna 1010.

As illustrated in FIG. 18, the wireless communication interface 1025 may include multiple BB processors 1026. For example, the multiple BB processors 1026 may be compatible with multiple frequency bands used by the eNB 1000. The wireless communication interface 1025 may include multiple RF circuits 1027, as illustrated in FIG. 18. For example, the multiple RF circuits 1027 may be compatible with multiple antenna elements. Although FIG. 18 illustrates the example in which the wireless communication interface 1025 includes the multiple BB processors 1026 and the multiple RF circuits 1027, the wireless communication interface 1025 may also include a single BB processor 1026 or a single RF circuit 1027.

Figure 19:
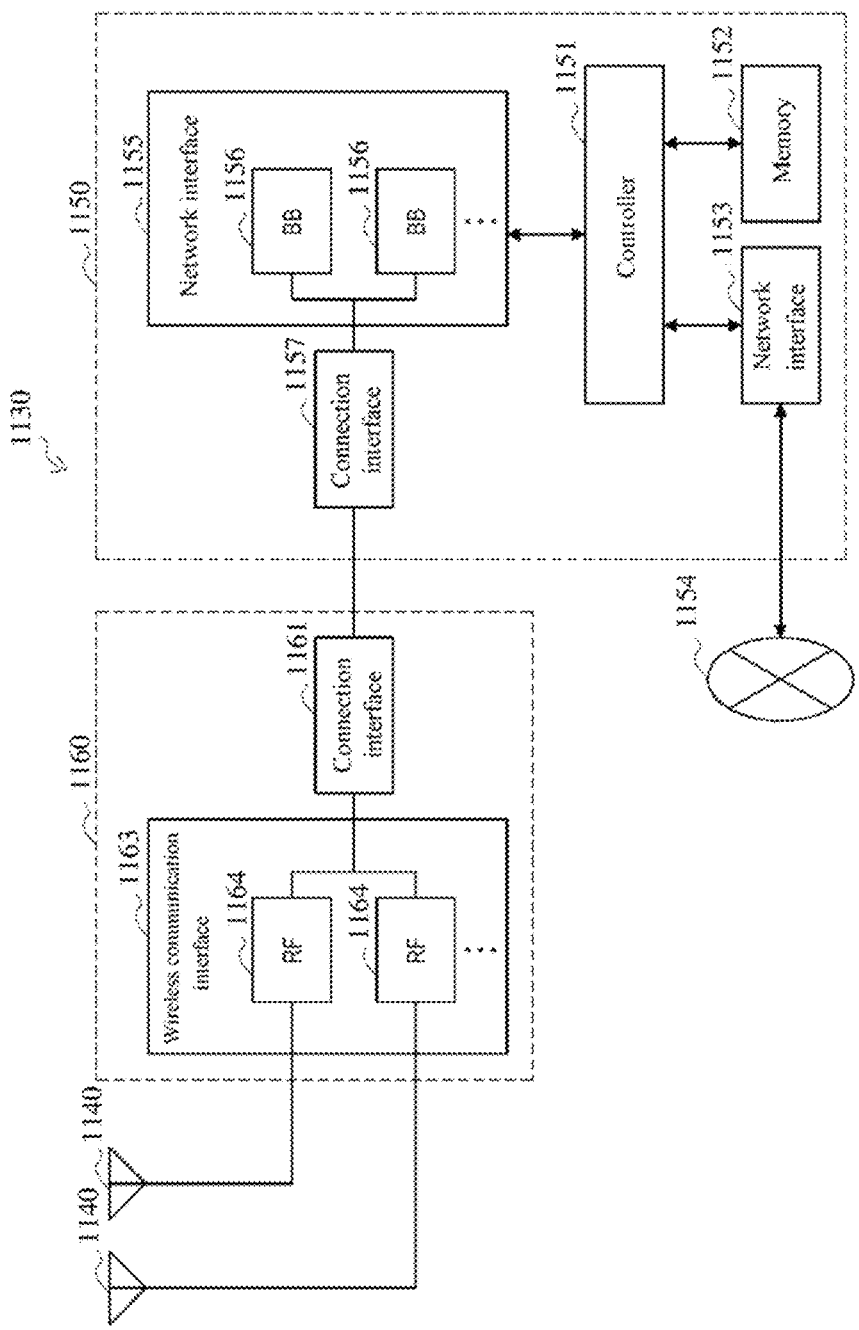
FIG. 19 is block diagram illustrating a second example of a schematic configuration of an eNB or a gNB to which the present disclosure is applied.

FIG. 19 is a block diagram illustrating a second example of a schematic configuration of an eNB to which the technology according to the present disclosure may be applied. An eNB 1130 includes one or more antennas 1140, a base station device 1150, and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in an MIMO antenna), and is used for the RRH 1160 to transmit and receive wireless signals. As illustrated in FIG. 19, the eNB 1130 may include multiple antennas 1140. For example, the multiple antennas 1140 may be compatible with multiple frequency bands used by the eNB 1130. Although FIG. 19 illustrates the example in which the eNB 1130 includes the multiple antennas 1140, the eNB 1130 may also include a single antenna 1140.

The base station device 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 18.

The wireless communication interface 1155 supports any cellular communication scheme (such as LTE and LTE-Advanced), and provides wireless communications to a terminal located in a sector corresponding to the RRH 1160 via the RRH 1160 and the antenna 1140. The wireless communication interface 1155 may typically include, for example, a BB processor 1156. Except connecting to an RF circuit 1164 of the RRH 1160 via the connection interface 1157, the BB processor 1156 is the same as the BB processor 1026 described with reference to FIG. 18. The wireless communication interface 1155 may include the multiple BB processors 1156, as illustrated in FIG. 19. For example, the multiple BB processors 1156 may be compatible with multiple frequency bands used by the eNB 1130. Although FIG. 19 illustrates the example in which the wireless communication interface 1155 includes the multiple BB processors 1156, the wireless communication interface 1155 may also include a single BB processor 1156.

The connection interface 1157 is an interface for connecting the base station device 1150 (a wireless communication interface 1155) to the RRH 1160. The connection interface 1157 may also be a communication module for a communication in the above high speed line of connecting the base station device 1150 (wireless communication interface 1155) to the RRH 1160.

The RRH 1160 includes a connection interface 1161 and a wireless communication interface 1163.

The connection interface 1161 is an interface for connecting the RRH 1160 (the wireless communication interface 1163) to the base station device 1150. The connection interface 1161 may also be a communication module for the communication in the above high speed line.

The wireless communication interface 1163 transmits and receives wireless signals via the antenna 1140. The wireless communication interface 1163 may typically include, for example, an RF circuit 1164. The RF circuit 1164 may include, for example, a frequency mixer, a filter and an amplifier, and transmit and receive wireless signals via the antenna 1140. The wireless communication interface 1163 may include multiple RF circuits 1164, as illustrated in FIG. 19. For example, the multiple RF circuits 1164 may support multiple antenna elements. Although FIG. 19 illustrates the example in which the wireless communication interface 1163 includes the multiple RF circuits 1164, the wireless communication interface 1163 may also include a single RF circuit 1164.

In the eNB 1000 illustrated in FIG. 18 and the eNB 1130 illustrated in FIG. 19, the processing circuit 1610 described with reference to FIG. 16 may be implemented by the controller 1021 and/or the controller 1151, and the communication unit 1620 described with reference to FIG. 16 may be implemented by the wireless communication interface 1025 and the wireless communication interface 1155 and/or the wireless communication interface 1163. At least a part of the functions may be implemented by the controller 1021 and the controller 1151. For example, the controller 1021 and/or the controller 1151 may perform a function of controlling by executing instructions stored in a corresponding memory.

Figure 20:
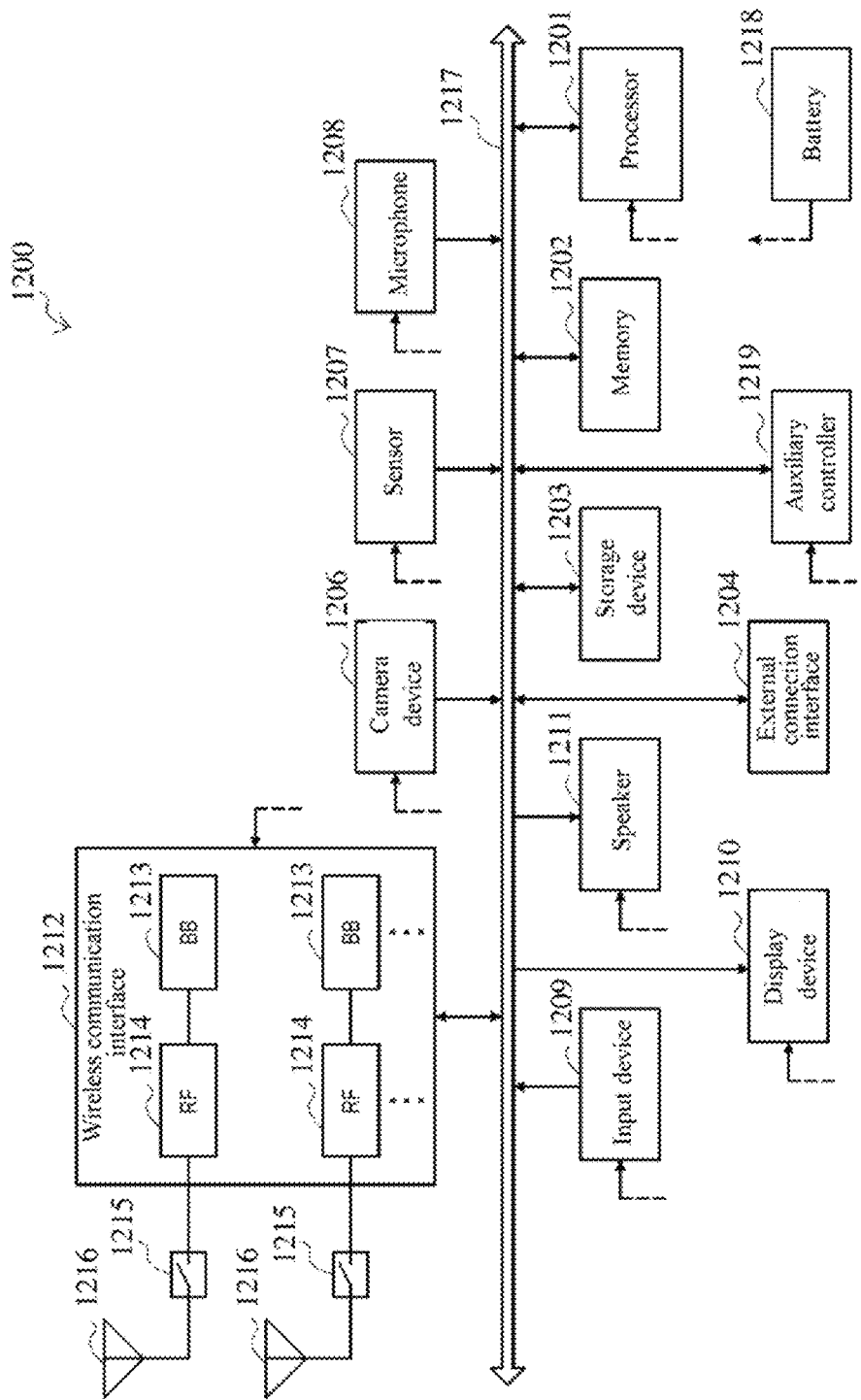
FIG. 20 is a block diagram illustrating an example of a schematic configuration of a smartphone to which the present disclosure is applied.

FIG. 20 is a block diagram illustrating an example of a schematic configuration of a smartphone 1200 to which the technology according to the present disclosure may be applied. The smartphone 1200 includes a processor 1201, a memory 1202, a storage device 1203, an external connection interface 1204, a camera device 1206, a sensor 1207, a microphone 1208, an input device 1209, a display device 1210, a loudspeaker 1211, a wireless communication interface 1212, one or more antenna switches 1215, one or more antennas 1216, a bus 1217, a battery 1218 and an auxiliary controller 1219.

The processor 1201 may be, for example, a CPU or a system on chip (SoC), and control functions of an application layer and other layers of the smartphone 1200. The memory 1202 includes an RAM and an ROM, and stores programs executed by the processor 1201 and data. The storage device 1203 may include a storage medium, such as a semiconductor memory and a hard disk. The external connection interface 1204 is an interface for connecting an external device (such as a memory card and a universal serial bus (USB) device) to the smartphone 1200.

The camera device 1206 includes an image sensor (such as a charge coupled device (CCD) and a complementary metal oxide semiconductor (CMOS)) and generates a captured image. The sensor 1207 may include a group of sensors, such as a measurement sensor, a gyroscope sensor, a geomagnetic sensor and an acceleration sensor. The microphone 1208 converts sound input into the smartphone 1200 into an audio signal. The input device 1209 includes, for example, a touch sensor configured to detect a touch on a screen of the display device 1210, a keypad, a keyboard, a button, or a switch, and receives an operation or information input from a user equipment. The display device 1210 includes a screen (such as a liquid crystal display (LCD) and an organic light-emitting diode (OLED) display), and displays an output image of the smartphone 1200. The loudspeaker 1211 converts an audio signal output from the smartphone 1200 into a sound.

The wireless communication interface 1212 supports any cellular communication scheme (such as LTE and LTE-advanced), and performs wireless communications. The wireless communication interface 1212 may typically include, for example, a BB processor 1213 and an RF circuit 1214. The BB processor 1213 may perform, for example, encoding/decoding, modulating/demodulating and multiplexing/de-multiplexing, and perform various types of signal processing for wireless communications. In addition, the RF circuit 1214 may include, for example, a frequency mixer, a filter and an amplifier, and transmit and receive wireless signals via the antenna 1216. The wireless communication interface 1212 may be a chip module on which the BB processor 1213 and the RF circuit 1214 are integrated. The wireless communication interface 1212 may include the multiple BB processors 1213 and the multiple RF circuits 1214, as illustrated in FIG. 20. Although FIG. 20 illustrates the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme, such as a short-distance wireless communication scheme, a near field communication scheme, and a wireless local area network (LAN) scheme. In this case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. The smartphone 1200 may include the multiple antennas 1216, as illustrated in FIG. 20. Although FIG. 20 illustrates the example in which the smartphone 1200 includes the multiple antennas 1216, the smartphone 1200 may also include a single antenna 1216.

Furthermore, the smartphone 1200 may include the antenna 1216 for each wireless communication scheme. In this case, the antenna switch 1215 may be omitted from the configuration of the smartphone 1200.

The bus 1217 connects the processor 1201, the memory 1202, the storage device 1203, the external connection interface 1204, the camera device 1206, the sensor 1207, the microphone 1208, the input device 1209, the display device 1210, the loudspeaker 1211, the wireless communication interface 1212 and the auxiliary controller 1219 to each other. The battery 1218 supplies power for blocks in the smartphone 1200 illustrated in FIG. 20 via a feeder which is indicated partially as a dashed line in the figure. The auxiliary controller 1219 operates a minimum necessary function of the smartphone 1200, for example, in a sleep mode.

In the smartphone 1200 illustrated in FIG. 20, the processing circuit 510 and the acquisition unit 511 and the estimation unit 512 in the processing circuit 510 described with reference to FIG. 5 may be implemented by the processor 1201 or the auxiliary controller 1219, and the communication unit 520 described with reference to FIG. 5 may be implemented by the wireless communication interface 1212. At least a part of the functions may be implemented by the processor 1201 or the auxiliary controller 1219. For example, the processor 1201 or the auxiliary controller 1219 may perform the information acquisition function and the estimation function by executing instructions stored in the memory 1202 or the storage device 1203.

Figure 21:
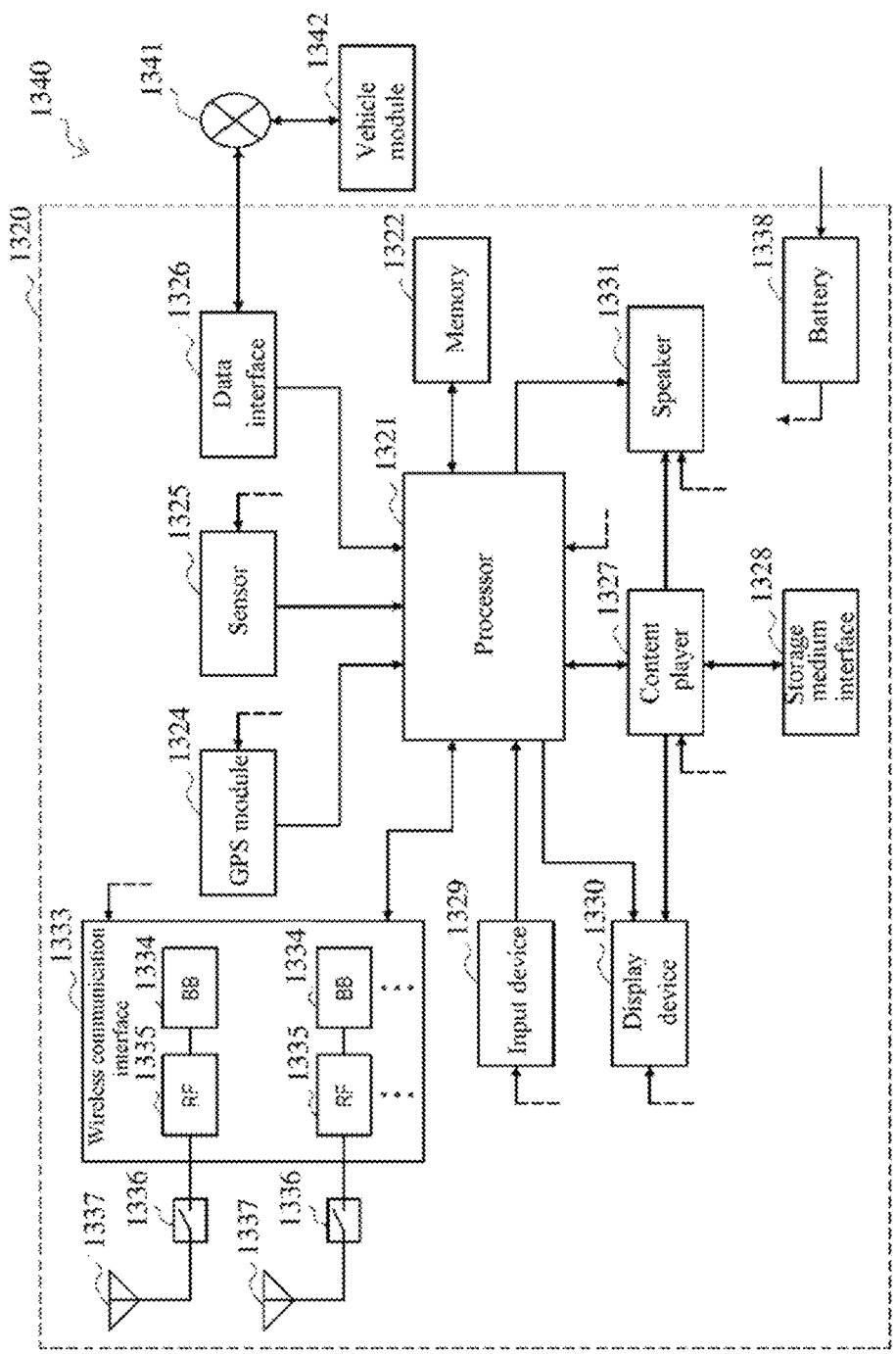
FIG. 21 is a block diagram illustrating an example of a schematic configuration of a vehicle navigation device to which the present disclosure is applied.

FIG. 21 is a block diagram illustrating an example of a schematic configuration of a vehicle navigation device 1320 to which the technology according to the present disclosure may be applied. The vehicle navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337 and a battery 1338.

The processor 1321 may be for example a CPU or an SoC, and control the navigation function and additional functions of the vehicle navigation device 1320. The memory 1322 includes an RAM and an ROM, and stores programs executed by the processor 1321 and data.

The GPS module 1324 measures a location of the vehicle navigation device 1320 (such as a latitude, a longitude and a height) using a GPS signal received from a GPS satellite. The sensor 1325 may include a group of sensors, such as a gyroscope sensor, a geomagnetic sensor and an air pressure sensor. The data interface 1326 is connected to, for example, an in-vehicle network 1341 via a terminal that is not illustrated, and acquires data generated by the vehicle (such as vehicle speed data).

The content player 1327 reproduces contents stored in a storage medium (such as a CD and a DVD), which is inserted into the storage medium interface 1328. The input device 1329 includes, for example, a touch sensor configured to detect a touch on a screen of the display device 1330, a button or a switch, and receives an operation or information input from a user equipment. The display device 1330 includes a screen of an LCD or OLED display for example, and displays an image with a navigation function or the reproduced content. The loudspeaker 1331 outputs a sound with a navigation function or the reproduced content.

The wireless communication interface 1333 supports any cellular communication scheme (such as LTE and LTE-advanced) and performs wireless communications. The wireless communication interface 1333 may typically include, for example, a BB processor 1334 and an RF circuit 1335. The BB processor 1334 may perform, for example, encoding/decoding, modulating/demodulating and multiplexing/de-multiplexing, and perform various types of signal processing for wireless communications. In addition, the RF circuit 1335 may include, for example, a frequency mixer, a filter and an amplifier, and transmit and receive wireless signals via the antenna 1337. The wireless communication interface 1333 may also be a chip module on which the BB processor 1334 and the RF circuit 1335 are integrated. The wireless communication interface 1333 may include multiple BB processors 1334 and multiple RF circuits 1335, as illustrated in FIG. 21. Although FIG. 21 illustrates the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to a cellular communication scheme, the wireless communication interface 1333 may support another type of wireless communication scheme, such as a short-distance wireless communication scheme, a near field communication scheme, and a wireless LAN scheme. In that case, the wireless communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in a MIMO antenna) and is used for the wireless communication interface 1333 to transmit and receive wireless signals. As illustrated in FIG. 21, the vehicle navigation device 1320 may include multiple antennas 1337. Although FIG. 21 illustrates the example in which the vehicle navigation device 1320 includes the multiple antennas 1337, the vehicle navigation device 1320 may also include a single antenna 1337.

Furthermore, the vehicle navigation device 1320 may include the antenna 1337 for each wireless communication scheme. In this case, the antenna switch 1336 may be omitted from the configuration of the vehicle navigation device 1320.

The battery 1338 supplies power for blocks of the vehicle navigation device 1320 illustrated in FIG. 21 via a feeder which is indicated partially as a dashed line in the figure. The battery 1338 accumulates power supplied from the vehicle.

In the vehicle navigation device 1320 illustrated in FIG. 21, the processing circuit 510 and the acquisition unit 511 and the estimation unit 512 in the processing circuit 510 described with reference to FIG. 5 may be implemented by the processor 1321, and the communication unit 520 described with reference to FIG. 5 may be implemented by the wireless communication interface 1333. At least a part of the functions may be implemented by the processor 1321. For example, the processor 1321 may perform various information acquisition functions and estimation functions by executing instructions stored in the memory 1322.

The technology according to the present disclosure may also be implemented as an in-vehicle system (or a vehicle) 1340 including one or more blocks of the vehicle navigation device 1320, the in-vehicle network 1341 and a vehicle module 1342. The vehicle module 1342 generates vehicle data (such as vehicle speed, engine speed, and fault information), and outputs the generated data to the in-vehicle network 1341.

In the system and method according to the present disclosure, it is apparent that each component and each step may be decomposed and/or recombined. These decompositions and/or recombinations should be considered as equivalents to the present disclosure. Also, the steps of executing the above described series of processes may be naturally performed in chronological order in the described order, but need not necessarily be performed in chronological order. Certain steps may be performed in parallel or independently of one another.

The embodiments of the present disclosure have been described in detail above with reference to the drawings. However, it should be understood that the above described embodiments are merely illustrative of the present disclosure and do not limit the present disclosure. Those skilled in the art can make various modifications and changes to the above embodiments without departing from the spirit and scope of the present disclosure. Therefore, the scope of the present disclosure is defined only by the appended claims and their equivalents.

The invention claimed is:

1. A user equipment in a wireless communication system, comprising:
    one or more processing circuits configured to perform operations while the user equipment is connectionless with an electronic equipment in the wireless communication system due to being in a Radio Resource Control (RRC) idle state, or is in connection with the electronic equipment but is in an RRC inactive state, the operations comprising:
    acquiring a downlink signal that is periodically transmitted by the electronic equipment the downlink signal comprising a Synchronization Signal Block (SSB) or a Channel State Information Reference Signal (CSI-RS);
    based on a phase angle of the downlink signal, estimating an Angle of Arrival (AOA) of the downlink signal;
    estimating a relative location of the user equipment based on the downlink signal and the estimated AOA,
    wherein the relative location of the user equipment is a location relative to a location of the electronic equipment, and
    wherein the relative location corresponds to a distance between the electronic equipment and the user equipment that is estimated by the electronic equipment based on a reception power of the downlink signal; and
    estimating an actual location of the user equipment based on the estimated relative location and a location of the electronic equipment that is indicated by geographical location information received from the electronic equipment via at least one of a physical downlink control channel (PDCCH) or a physical downlink shared channel (PDSCH).

2. The user equipment according to claim 1, wherein estimating the AOA comprises each of:
    estimating an AOA in a first direction and estimating an AOA in a second direction perpendicular to the first direction.

3. The user equipment according to claim 2,
wherein the AOA in the first direction is a horizontal AOA, which indicates an included angle between a projection of a direction of arrival of the downlink signal on a horizontal plane and a horizontal reference direction, and
wherein the AOA in the second direction is a vertical AOA, which indicates an included angle between a projection of the direction of arrival of the downlink signal on a vertical plane and a vertical reference direction.

4. The user equipment according to claim 1,
wherein the downlink signal from the electronic equipment is one of a plurality of downlink signals from a plurality of electronic equipments, respectively, and the one or more processing circuits are further configured to perform operations of:
estimating an AOA of a second downlink signal of the plurality of downlink signals,
wherein the relative location of the user equipment and the actual location of the user equipment is estimated based on the AOA of the downlink signal and the AOA of the second downlink signal, and
wherein the relative location of the user equipment is a location relative to both the location of the electronic equipment and a location of the second electronic equipment.

5. The user equipment according to claim 4, wherein after estimating the AOA of the downlink signal and the AOA of the second downlink signal, the one or more processing circuits are further configured to perform operations of:
causing the user equipment to transit from the RRC idle state or the RRC inactive state to an RRC connected sate; and
transmitting information on the AOA of the downlink signal and information on the AOA of the second downlink signal to a service base station of the user equipment, so as to enable the service base station to estimate the location of the user equipment based on the AOA of the downlink signal, the AOA of the second downlink signal, the location of the electronic equipment and the location of the second electronic equipment.

6. The user equipment according to claim 1, further comprising a massive Multiple-input Multiple-Output (MIMO) antenna array, wherein the wireless communication system is a 5G New Radio NR system, and the electronic equipment is a base station or a Transmitting/Receiving Port (TRP).

7. A method for performing wireless communication by a user equipment in a wireless communication system, the method performed while the user equipment is connectionless with an electronic equipment in the wireless communication system due to being in a Radio Resource Control (RRC) idle state, or is in connection with the electronic equipment but is in an RRC inactive state, the method comprising:
acquiring a downlink signal periodically transmitted by the electronic equipment, the downlink signal comprising a Synchronization Signal Block (SSB) or a Channel State Information Reference Signal (CSI-RS);
based on a phase angle of the downlink signal, estimating an Angle of Arrival (AOA) of the downlink signal;
estimating a relative location of the user equipment based on the downlink signal and the estimated AOA,
wherein the relative location of the user equipment is a location relative to a location of the electronic equipment, and
wherein the relative location corresponds to a distance between the electronic equipment and the user equipment that is estimated by the electronic equipment based on a reception power of the downlink signal; and
estimating an actual location of the user equipment based on the estimated relative location and a location of the electronic equipment that is indicated by geographical location information received from the electronic equipment via at least one of a physical downlink control channel (PDCCH) or a physical downlink shared channel (PDSCH).

* * * * *